US011585460B2

United States Patent
Chien et al.

(10) Patent No.: US 11,585,460 B2
(45) Date of Patent: Feb. 21, 2023

(54) DIAPHRAGM VALVE STRUCTURE

(71) Applicant: BUENO TECHNOLOGY CO., LTD., Tainan (TW)

(72) Inventors: Huan-Jan Chien, Tainan (TW); Po-Wen Chen, Tainan (TW); Huan-Ciao Hong, Tainan (TW)

(73) Assignee: Bueno Technology Co., Ltd., Tainan (TW)

( * ) Notice: Subject to any disclaimer, the term of this patent is extended or adjusted under 35 U.S.C. 154(b) by 0 days.

(21) Appl. No.: 17/339,101

(22) Filed: Jun. 4, 2021

(65) Prior Publication Data

US 2021/0293350 A1 Sep. 23, 2021

Related U.S. Application Data

(62) Division of application No. 16/562,343, filed on Sep. 5, 2019, now Pat. No. 11,067,192.

(30) Foreign Application Priority Data

Sep. 5, 2018 (TW) ................................ 107131198

(51) Int. Cl.
 *F16K 49/00* (2006.01)
 *F16K 31/122* (2006.01)
 *F16K 7/12* (2006.01)
(52) U.S. Cl.
 CPC ............ *F16K 31/1221* (2013.01); *F16K 7/12* (2013.01); *F16K 49/005* (2013.01)

(58) Field of Classification Search
 CPC ...... F16K 7/12; F16K 31/122; F16K 31/1221; F16K 49/005; F16K 27/0236
 See application file for complete search history.

(56) References Cited

U.S. PATENT DOCUMENTS 2,823,696 A ‡ 2/1958 Detlefson ............... F16K 41/12
  137/340
4,840,347 A ‡ 6/1989 Ariizumi ............. F16K 31/1221
  251/63.4

(Continued)

FOREIGN PATENT DOCUMENTS

CN 103717954 A ‡ 4/2014 ........... F16K 31/122
CN 104633171 A ‡ 5/2015 ......... F16K 31/1221

(Continued)

*Primary Examiner* — Umashankar Venkatesan
(74) *Attorney, Agent, or Firm* — Rosenberg, Klein & Lee

(57) ABSTRACT

A diaphragm valve structure having application in diaphragm valves made completely from fluororesin at an operating temperature of 200° C. The diaphragm valve uses a heat isolation method that consists of a heat transfer limiting structure and a heat dissipating structure, ensuring rigidity of the gas cylinder structure. The heat transfer limiting structure uses lattice-shaped ribbed plates with horizontal openings, wherein the lattice-shaped ribbed plates and a minimum diameter area of an annular portion are all provided with heat transfer section thickness. The heat dissipating structure consists of a multilayered structure for a preferred external natural cooling, and further using a coolant gas ensuring that the peripheral portion of the diaphragm and gas-tight components on the valve shaft are sufficiently cooled.

2 Claims, 22 Drawing Sheets

(56) References Cited

U.S. PATENT DOCUMENTS

| | | | | |
|---|---|---|---|---|
| 5,007,328 A | ‡ | 4/1991 | Otteman | F16K 31/1221 251/63.5 |
| 6,086,039 A | ‡ | 7/2000 | Sievers | F16K 31/1221 251/61.5 |
| 6,123,320 A | ‡ | 9/2000 | Rasanow | F16K 31/122 251/331 |
| 6,612,538 B2 | ‡ | 9/2003 | Fukano | F16K 27/02 251/63.5 |
| 2001/0028049 A1 | ‡ | 10/2001 | Mamyo | F16K 31/1221 251/63.5 |
| 2003/0201015 A1 | ‡ | 10/2003 | Fukano | F16K 7/14 137/556 |
| 2006/0145107 A1 | ‡ | 7/2006 | Masamura | F16K 7/14 251/63.5 |
| 2014/0077109 A1 | * | 3/2014 | Miyashita | F16K 31/122 251/63.5 |
| 2019/0093772 A1 | ‡ | 3/2019 | Iizuka | F16K 7/14 |

FOREIGN PATENT DOCUMENTS

| | | | | |
|---|---|---|---|---|
| JP | H04181079 A | ‡ | 6/1992 | |
| JP | H08152078 A | ‡ | 6/1996 | |
| JP | H09217845 A | ‡ | 8/1997 | |
| JP | 2004019792 A | ‡ | 1/2004 | |
| JP | 2009002442 A | ‡ | 1/2009 | |
| JP | 2010121689 A | ‡ | 6/2010 | |
| TW | 201702508 A | ‡ | 1/2017 | F16K 1/14 |

\* cited by examiner
‡ imported from a related application

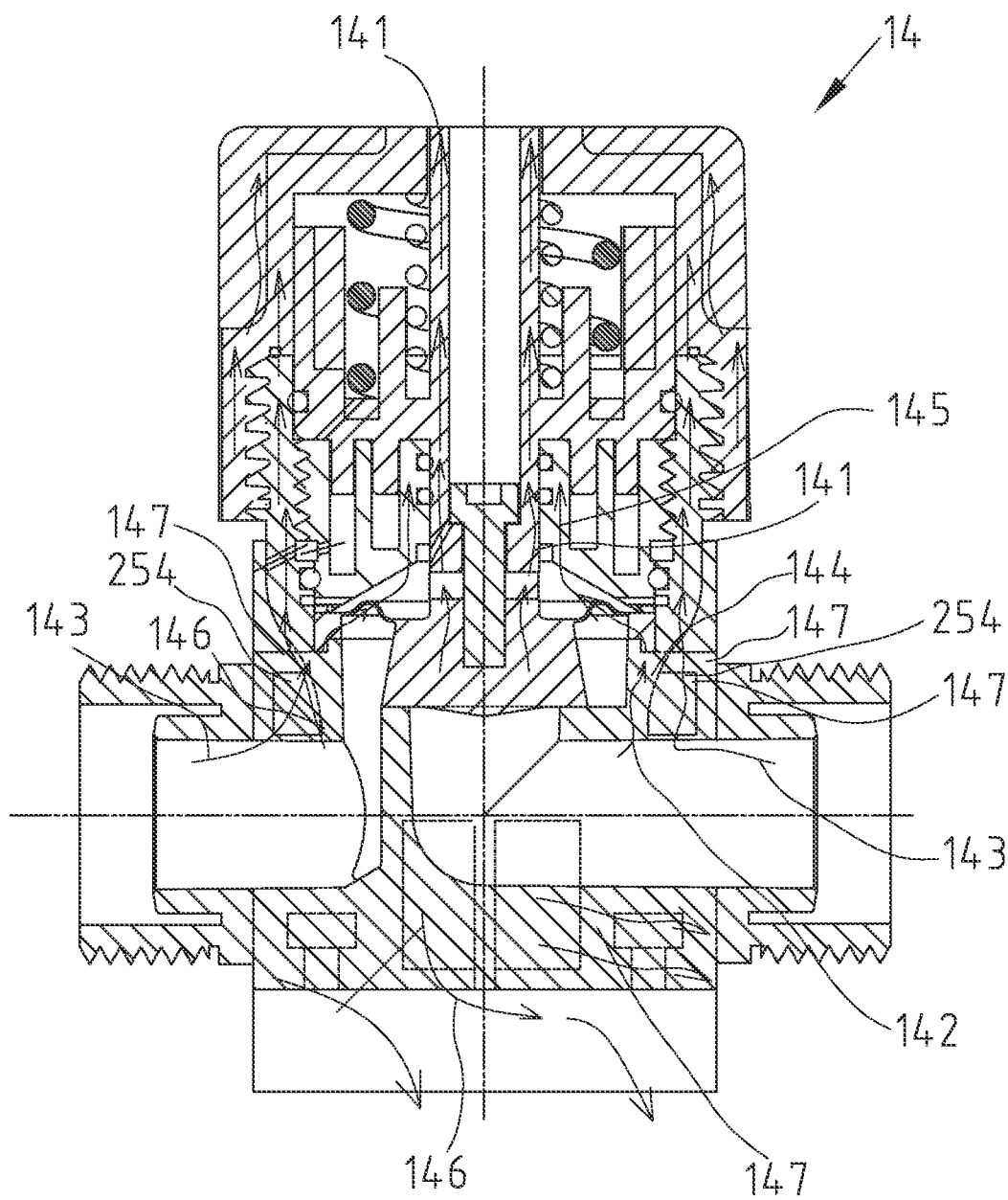
F I G . 2B

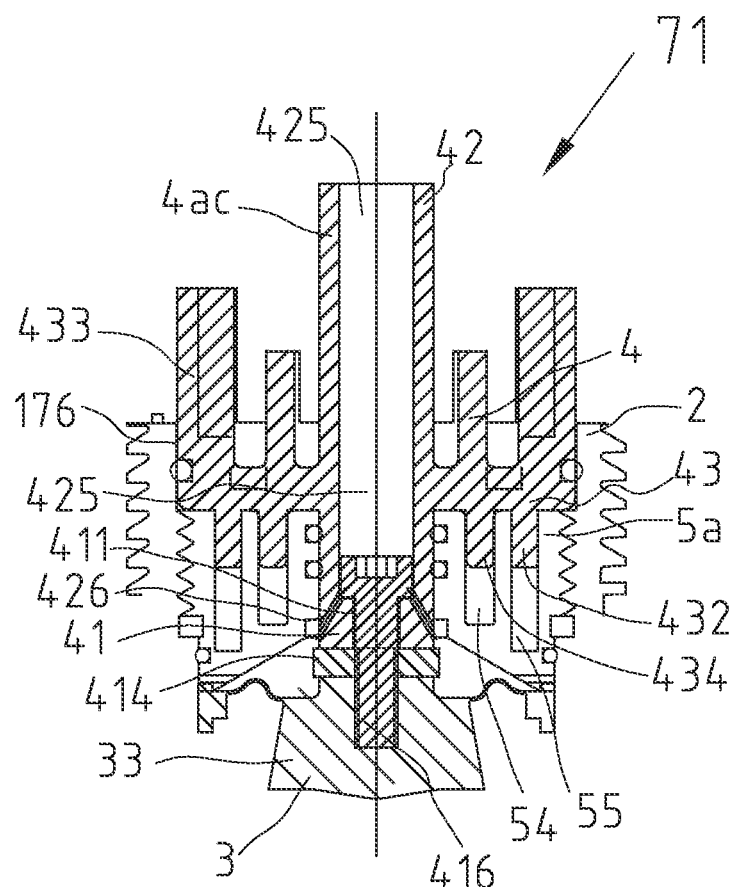
F I G . 4A

DIAPHRAGM VALVE STRUCTURE

CROSS REFERENCE TO RELATED APPLICATIONS

This application is a Divisional of U.S. patent application Ser. No. 16/562,343 filed on 5 Sep. 2019, which claims the priority benefit of Taiwanese patent application No. 107131198 filed on Sep. 5, 2018, the entire contents and disclosures of which are incorporated herein by reference.

BACKGROUND OF THE INVENTION

(a) Field of the Invention

The present invention relates to a diaphragm valve structure, and more particularly to a diaphragm valve made from fluororesin that achieves an extremely low heat transfer coefficient of approximately 0.25 W/(mK), which is far below that of ceramic aluminum oxide ($Al_2O_3$) that achieves a heat transfer coefficient of 30 W/(mK). Such an extremely low heat transfer characteristic enables the fluororesin material to withstand an operating environment at a high temperature of 250° C. However, the diaphragm valve must withstand high pressure, and currently only has application in a high corrosive environment at a high temperature less-than 160° C. In order to achieve the capability for application in an operating environment at a high temperature of 250° C., the diaphragm must be supported by metallic structural components. Nonetheless, in actual practice, a metal ball valve with a fluororesin inner lining can also be used at a high temperature of 200° C. and in a high corrosive environment, clearly revealing that requiring a diaphragm valve made completely from fluororesin in an operating environment at a high temperature of 200° C. and in a high corrosive environment is still a huge challenge.

(b) Description of the Prior Art

Diaphragm valves of the prior art use sealing and joining of a diaphragm made from fluororesin to a valve body, and through combined driving of a valve shaft and separation from a corrosive liquid, corrosion resistant diaphragm valves of the prior art have widespread application. Moreover, various types of structures have been developed for a variety of application needs are suitable for a plurality of applications operating at middle and low temperatures less than 160° C. and in a high corrosive environment.

Diaphragm valves of the prior art are generally provided with one or a number of the following characteristics:
1. Use of a piston of a high pressure gas actuated valve shaft as a switch;
2. Hand-operating mechanism;
3. Use of an electric mechanism as a switch;
4. Use of a mechanism to regulate flow;
5. Removes static electricity produced by channeling liquid;
6. Use of metallic bolts to tightly lock a valve body;
7. Use of non-metallic screw threads to tightly fasten a valve body;
8. Structures that do not release particles;
9. Prevents structural creeping;
10. Leakage detection.

Diaphragm valves made from fluororesin of the prior art are assembled from a valve portion and an actuation gas cylinder. The valve portion comprises components including a valve body and a diaphragm, while the actuation gas cylinder comprises components including an upper valve body, a valve upper cover, and a valve shaft. The valve body comprises a square portion and an annular portion. An actuation gas cylinder of the prior art assembled from the upper valve body and the valve upper cover is used to contain the components including the valve shaft, a piston, and a spring. And high pressure to drive gas on the reverse side of the spring force to drive switching of the diaphragm. The actuation gas cylinder also comprises a gas cylinder structure, which, according to application use, can be separated into use in non-metallic diaphragm valves and metallic diaphragm valve; or, according to structure, separated into non-metallic normally closed diaphragm valves, non-metallic normally open diaphragm valves, metallic normally closed diaphragm valves, and metallic normally open diaphragm valves. Threaded teeth are used as the tight locking method between the valve body, upper valve body, and valve upper cover of the non-metallic diaphragm valve; and is most suitable for use with extremely clean fluid channeling. Each of the four corners of a metallic gas cylinder structure is tightened and sealed using a metal bolt, which tightens and seals together the valve body, upper valve body, and valve upper cover. Each of the bolts is protected by an upper bolt sleeve and a lower bolt sleeve that protect the valve body. The upper bolt sleeve is positioned on an external ring surface of the valve upper cover; the lower bolt sleeve is positioned on an external ring surface of the upper valve body. A first sealing face is positioned between the upper bolt sleeve and the lower bolt sleeve, and a second sealing face is also positioned between the lower bolt sleeve and the annular portion of the valve body. Diaphragms of the prior art are installed on the inner side of the valve body opening, and a peripheral portion of the diaphragm is tightened inside a seal groove by the upper valve body. A valve shaft set structure installed inside the gas cylinder structure comprises components including the diaphragm, the valve shaft, and the upper valve body; and can be separated into a normally closed valve shaft set and a normally open valve shaft set. The upper valve body is normally used for tightening and fixing the valve shaft set of the metallic diaphragm valve; and external threaded teeth of the upper valve body are normally used for tightening and fixing the valve shaft set of the non-metallic diaphragm valve; while some use a radial protruding edge of the upper valve body for tightening and fixing. The gas chamber of the gas cylinder structure of the prior art is installed inside the upper valve body or the valve upper cover. When the piston is performing up and down reciprocating motion in the gas chamber, the upper valve body must sustain multiple vibrations and considerable gas chamber stress, which easily cause bending of the valve shaft, resulting in the diaphragm leaking. Positions of the lower bolt sleeves of the second sealing face are close to the outer edge of the diaphragm, which also result in the worrying problem of two-way permeation contamination, meaning the manufacturing engineer needs to constantly pay attention to the corrosion condition of the metal bolts.

General specifications of diaphragm valves of the prior art:

Operating temperature: less than 80° C.; a few specially designed diaphragm valves can operate at less than 160° C.

Normal temperature pressure rating: 3 $kg/cm^2$, 5 $kg/cm^2$.

When a special design is used for the diaphragm and the valve body structure has additional thickness, then normal temperature pressure rating can reach 7 $kg/cm^2$. In other words, none of the diaphragm valves of the prior art can satisfy the requirements for application at an operating temperature of 200° C.

The amount of heat transfer of fluororesin is equals a multiplication product of its heat transfer coefficient, surface heat transfer, and temperature gradient. An extremely low heat transfer coefficient of approximately 0.25 W/(mK) provides a viable condition for high temperature operation using fluororesin. The greater the surface heat transfer, the greater the amount of heat transferred and the higher the temperature of the entire structure of the diaphragm valve. The higher the temperature gradient, the greater the amount of heat transferred, and the higher the temperature gradient represents a greater number of normal temperature areas on the entire structure of the diaphragm valve. Such normal temperature structures are able to provide a preferred structural strength, however, they need greater heat dissipation in order to maintain a normal temperature structure and provide structural strength. Heat source areas of the diaphragm valve include a valve box heat source area, flow channel heat source area, inlet pipe heat source area, outlet pipe heat source area, inlet connection heat source area, and an outlet connection heat source area. A high temperature liquid passes through pipes, the valve structure, and the diaphragm, and is then transmitted outward. The peripheral portion of the diaphragm is close-fitting to the flow channel heat source area, the tightening portion of the valve body and the upper valve body are the main paths for outward heat transmission from the heat source areas. The square portion has a thick structure at the upper side of the inlet pipe, which becomes one of the main paths for outward heat transmission to the gas cylinder structure. Diaphragm valve structures of the prior art guide and continue to accumulate heat inside the diaphragm valve, which causes the entire structure to be at a high temperature and reduces the temperature gradient; moreover, is unable to maintain structural strength. Sealing components such as a fluororesin O-ring are unable to avoid the danger of high temperatures, and can only be used at an operating temperature less-than 160° C.

Regarding diaphragm valves that are able to operate at temperatures of 200° C., their structure must satisfy the following four requirements. First, the structure must deal with heat source separation of a plurality of heat source areas using a heat transfer limiting structure and a heat dissipating structure. The heat transfer limiting structure places a restriction on the heat transfer section thickness of the structure to form a heat transfer restriction area. The heat dissipating structure consists of natural cooling and internal cooling, by which the heat dissipating structure is able to reduce transmission of heat from the heat source areas to the structure, and provides a high temperature gradient to maintain structural strength. The problems of heat source separation are described below:

Problem 1: Heat transfer restriction. Surface heat transfer refers to structural sectional areas of heat transfer paths of the heat source areas, which must be restricted to achieve the object of reducing the amount of heat transferred. The heat source areas transmit heat through a square plate, accumulated thickness, flow channel side wall, and perpendicular ribbed plates of the square portion, and then transmitted to the annular portion and the upper valve body, which results in an even greater amount of heat being transmitted to the gas cylinder structure. The central portion of the diaphragm has a large area that absorbs and channels heat into liquid, and a large amount of heat is transmitted to the valve shaft; moreover, accumulated thickness on the upper side of the inlet pipe has a large surface heat transfer that causes direct transmission of heat from the outlet heat source areas and the inlet heat source areas to the square plate, the annular portion, and the upper valve body. The annular portion and the upper valve body both have a large surface heat transfer area that form the main paths for heat transfer. The inlet and outlet pipe connections are also connected to the accumulated thickness areas, and the four bolts also have substantial thickness and area that produce large heat transfer; moreover, the four metal bolts themselves are also good conductors for heat transmission.

Problem 2: Natural cooling. The external structure surface must have sufficient natural cooling, otherwise, it is unable to provide a sufficient heat dissipating capacity to maintain a temperature gradient and structural strength. In particular, hot gas in the interior of the square portion is unable to dissipate outward, and only allows a large amount of heat to transmit upward to the annular portion, whereupon the heat passes therethrough and transmitted to the large sectional area of the upper valve body.

Problem 3: Internal cooling. The diaphragm is close-fitting to the heat source areas; moreover, the peripheral portion of the diaphragm is close-fitting to the annular portion and becomes a heat centralized area, which is a position that easily distorts resulting in leakage. The central portion of the diaphragm has a large area that absorbs and channels heat into liquid, with a large amount of heat being transmitted to the valve shaft. A coolant gas is drawn in externally and must satisfy the cooling requirements of the peripheral portion of the diaphragm and the valve shaft. In addition. there is also the problems of the structures of the valve portion and the actuation gas cylinder having to sustain pressure and a reciprocating motion of the piston, including the problems of surrounding corrosive gas, all of which result in sealing failure. These problems are described below:

Problem 4: Tightening and sealing. As for the three above mentioned problems of structural strength, reciprocating motion of the piston, and environmental corrosive gas; first, regarding structural strength, the gas cylinder structure and the valve body are subjected to the tightening force of the four metal bolts to effect sealing thereof. However, when the structural strengths of the components themselves are inadequate then structural creeping occurs. For example, when the thickness of the structures is too thin, high temperatures will result in structural distortion, which greatly reduces the tightening force of the bolts causing the diaphragm to leak. Regarding reciprocating motion of the piston, the reciprocating motion of the piston, counteracting forces of springs, and actuation gas pressure are all sustained by the gas cylinder structure; moreover, acting forces will directly be applied to the upper valve body and then transmitted to the valve body, which will impact the tightening force on the diaphragm. In addition, the effect of vibration on the gas cylinder structure and the valve body will also result in structural creeping and distortion, which will reduce the tightening force of the bolts. And reduction in the tightening force on the peripheral portion of the diaphragm will result in leakage. Regarding corrosion by the surrounding gas, the four tightening bolts are protection of by bolt sleeves, however, high penetrability of corrosive gas will still intrude into the first sealing face and the second sealing face of the bolt sleeves, resulting in damage to the bolts and reducing the tightening force thereof. In particular, the position of the second sealing face of the bolt sleeves is close to the outer edge of the diaphragm, which will greatly increase the risk of the bolts becoming eroded and the worrying problem of two-way permeation contamination.

Accordingly, with continued operation in an operating environment at a high temperature of 200° C., the diaphragm valve will inevitably encounter the above-described problems 1 to 4. The following describes the problems regarding other important requirements:

Problem 5: Vibration damper device. Reciprocating motion of the piston and the counteracting forces of springs produces vibration, and after a long period of operation, structural creeping and distortion will cause reduction in the degree of tightness in the structure. Hence, numerous prior art technologies use springs or vibration damping rubber to reduce vibration to prevent leakage in the diaphragm; moreover, reducing vibration also decreases production of friction particles.

Problem 6: Friction particles. Concentricity and perpendicularity of the valve shaft must be ensured, especially when operating at 200° C., so as to ensure a frontal surface press connection between the diaphragm and the valve seat with no friction therebetween, thus, safeguarding against particles being produced. In addition, structural distortion of the valve body, upper valve body, and valve upper cover results in the valve shaft being unable to maintain concentricity and perpendicularity, and a frontal surface press connection cannot be effected between the diaphragm and the valve seat, causing friction therebetween and the production of friction particles. Hence, numerous prior art technologies adopt vibration damping methods to resolve such problems.

Problem 7: Eliminating static electricity. The problem of an accumulation of static electricity in both the valve body and the diaphragm occurs when channeling nonconducting liquid; when the problem becomes serious, discharge sparks will damage the diaphragm. Hence, numerous prior art technologies use conducting material attached to a non-liquid contact side of the diaphragm to conduct away the accumulated static electricity, thereby preventing damage to the diaphragm occurring due to electric discharge.

Reference Example 1

With reference to the 2009 Japanese Patent No. JP2009002442 (A), which describes a Fluid Control Valve, the contents of this reference example 1 is provided in a similar vein and describes a diaphragm valve operating at a temperature 160° C. Referring to FIG. 6A and FIG. 6B, which show a diaphragm valve 9 of the prior art made from fluororesin, wherein the diaphragm valve 9 is a metallic normally closed diaphragm valve that is provided with a normally closed valve shaft set 961 (see FIG. 6C), which is assembled from a valve portion 90a and an actuation gas cylinder 90b. The valve portion 90a and the actuation gas cylinder 90b assume square shapes, however, the internal portions of both assume a circular structure. A bolt hole is provided in each of the four corner portions, and metal bolts are used to secure screw tight connections and maintain gas tightness. The metal bolts are respectively installed in the interior of bolt sleeves, and the bolt sleeves are separated into upper bolt sleeves and lower bolt sleeves. An upper sealing face is provided between the upper bolt sleeves and the lower bolt sleeves; moreover, a lower sealing face is provided between the lower bolt sleeves and the valve portion. The valve portion 90a comprises components including a valve body 91, a diaphragm 92, and a mounting plate. The actuation gas cylinder 90b comprise the components including an upper valve body 93, a valve upper cover 94, and a valve shaft 95.

The problems that need resolving in the present reference example 1 involve improving the rigidity of the valve body 91, because under a high operating temperature, the valve body 91 being subjected to pressure at an inlet pipe and an outlet pipe will distort; in particular, the sealing portion position of the diaphragm 92 is unable to maintain a circular shape, resulting in leakage, see FIG. 11 of the Fluid Control Valve invention of the prior art as disclosed in Japanese Patent No. JP2009002442 (A).

The valve body 91 is fitted with an inlet pipe 911, an outlet pipe 912, a valve box 913, an annular portion 915, and a square portion 916. The diaphragm 92 is fitted with a peripheral portion 921, an elastic strip 922, and a central portion 923. The upper valve body 93 is provided with an external ring surface 931, an internal ring surface 932, a lower sealing face 933, a tightening portion 934, a shaft hole portion 935, and a diaphragm chamber 936. The valve upper cover 94 is fitted with an internal holding chamber 941, a top portion 942, an external ring surface 943, and an upper sealing face 944. The valve shaft 95 is fitted with a threaded teeth portion 951, a shaft rod 952, and a piston portion 953. The valve box 913 is fitted with a valve seat 9131, a flow channel 9132, a seal groove 9133, and a flow channel side wall 9134. The upper valve body 93 and the valve upper cover 94 construct a gas cylinder structure, which contains a gas chamber therein. The gas chamber is separated by the piston 953 portion to form an upper gas chamber and a lower gas chamber.

The peripheral portion 921 of the diaphragm 92 is fixed in the seal groove 9133 on the upper edge of the flow channel side wall 9134, which enables complete sealing of the entire valve box 913. The central portion 923 corresponds to the valve seat 9131 and acts as a switch. The lower sealing face 933 is positioned adjacent to the upper side of the peripheral portion 921 of the diaphragm 92.

The upper valve body 93 is installed between the annular portion 915 of the valve body 91 and the valve upper cover 94. The upper valve body 93 assumes a central, convex, open cup-shaped structure, wherein the internal ring surface 932 of the upper valve body 93 is fitted with a gas chamber 937, which is used for coupling with the piston portion 953 of the valve shaft 95. The outer edge of the bottom portion of the upper valve body 93 is fitted with the tightening portion 934, which is used to tighten the peripheral portion 921 of the diaphragm 92; moreover, the bottom portion forms a conical form, from which protrudes to form the centrally positioned shaft hole portion 935, and a square form below the conical form forms the diaphragm chamber 936. The shaft hole portion 935 is used to contain the valve shaft 95, and the external ring surface 931 is fitted with an actuation gas connection 171.

The valve upper cover 94 assumes an inverted cup shape assembled on the upper valve body 93. The upper valve body 93 and the internal holding chamber of the valve upper cover 94 construct the gas cylinder structure and an actuation gas cylinder. As well as being used to contain the components including the valve shaft 95, the piston 953, and springs 12.

An inlet pipe connection installed on a side wall of the square portion 916 connects to the inlet pipe 911, which horizontally penetrates the square portion 916 and then bends through an angle to form a rear opening in the center of the valve seat 9131 of the valve box 913, which is used to join with the central portion 923 of the diaphragm 92, The opening of the outlet pipe 912 is configured at the flow channel side wall 9134 and penetrates another side outer wall of the square portion 916 to connect to an outlet pipe connection.

The periphery of the valve seat 9131 in the interior of the valve box 913 forms a circumferential symmetrical, indented flow channel 9132. The highest area of the flow channel 9132 is positioned above the horizontal inlet pipe 911, two sides of which arc downward as hollows and extend around the valve seat 9131, with the lower-most point connecting to a low side of the internal diameter of the horizontal outlet pipe 912. An upper edge of the flow channel side wall 9134 is provided with the seal groove 9133, which connects with the annular portion 915.

An opening is formed in the middle of a square plate 9161 of the square portion 916 that is used to contain the valve box 913. the square plate 9161 connects to the flow channel side wall 9134 and also connects to the lower edge of the annular portion 915. Apart from being configured with a square cylindrical outer wall extending downward from the lower side of the square plate 9161, the lower inner side of the square plate 9161 is also fitted with lattice-shaped, longitudinal, vertical ribbed plates 9162 with lower side openings. The square plate 9161, the annular portion 915, and the valve box 913 extend upward from the bottom portion of the openings. These longitudinal vertical ribbed plates 9162 perpendicularly cross over the lower side of the square plate 9161.

The inlet pipe 911, the outlet pipe 912, and the valve box 913 construct a structural support, and a square portion of the structural support is named a first molded square portion. Because the valve body is formed by ejection or extrusion molding using PFA (PolyFluoroAlkoxy), the ribbed plates 9162 are formed using slide blocks from the bottom portion, therefore, the upper sides of the inlet pipe 911 and the outlet pipe 912, starting from the spaces between a horizontal center line to the square plate 9161 are filled with PFA material. The PFA material accumulation is named the accumulated thickness 9163 and directly connects with the square plate 9161, the flow channel side wall 9134, the seal groove 9133, the inlet pipe 911, and the outlet pipe 912. When the inlet pipe 911, the outlet pipe 912, and the valve box 913 are full with high temperature, high-pressure liquid causing distortion, the square plate 9161 must also distort along therewith, thereby connectively affecting roundness of the flow channel side wall 9134, and consequently affecting the gas-tight seal of the diaphragm 92. The lower side of the annular portion 915 is installed on the square plate 9161 and also positioned at the outer side of the seal groove 9133 of the valve box 913; moreover, a sealing face 9151, the external ring surfaces 931, 943 upwardly extend from the annular portion 915 and include opening portions and breathing holes 9155. The annular portion 915 provided with the breathing holes 9155 above the seal groove 9133 are used to satisfy the breathing needs of the diaphragm 92 when opening and closing. The height of the annular portion 915 only satisfies the needs of the seal groove 9133 and the breathing holes 9155, to enable the annular portion 915 and the valve box 913 to construct a cup-shaped structure. The opening portion of the cup-shaped structure is made gastight by the diaphragm 92, and the cup-shaped structure contains a high temperature liquid and is able to withstand the liquid pressure therefrom. The outer edge of the cup-shaped structure forms the annular portion 915, and an outer edge height is provided between the annular portion 915 and the peripheral portion 921; for example, the outer edge height of an one inch opening diameter diaphragm valve is approximately 6 mm. Regarding the cup-shaped structure, because it is a shallow cup shape, when the valve box 913 is subjected to high temperature and high pressure liquid, because the peripheral portion 921 of the diaphragm 92 is assembled next to the outer edge of the cup-shaped structure, thus, the peripheral portion 921 very easily distorts causing leakage. Furthermore, because the outer edge height is only approximately 6 mm, it is unable to provide sufficient structural strength, and the addition of the high temperature and high pressure stress causes the inlet pipe 911, the outlet pipe 912, and the accumulated thickness 916 to distort, as a consequence, the seal groove 9133 very easily leaks. In practice, the breathing holes 9155 are sometimes used to detect leakage. see FIG. 11 of the Fluid Control Valve invention of the prior art as disclosed in Japanese Patent No. JP2009002442 (A).

The structure of the valve shaft set 961 comprises components including the diaphragm 92, the valve shaft 95, and the upper valve body 93, wherein the shaft rod 952 passes through the shaft hole portion 935 of the upper valve body 93, and the threaded teeth portion 951 is used as the tight fastening method. a gas-tight sealing fluororesin O-ring is fitted on the shaft hole portion 935, and is used to prevent liquid leaking therefrom when the diaphragm 92 is damaged, as well as providing the gas cylinder structure with a gas-tight seal. The piston portion 953 is positioned at the upper side of the upper valve body 93 and is joined to the shaft rod 952. The outer edge of the piston portion 953 is fitted with the fluororesin O-ring connects and seals a gas chamber 90*d*, and also separates it into an upper gas chamber and a lower gas chamber. When any one of the gas chambers is full of gas, then the piston portion 953 is driven by the high pressure gas and performs a corresponding movement along with the internal ring surface 932. Moreover, because of the force and pressure of actuation gas imposed on and sustained by the piston portion 953, the upper valve body 93 can also possibly distort, resulting in deviation in concentricity and perpendicularity of the valve shaft 95. And because the upper valve body 93 is assembled on the sealing face 9151 of the annular portion 915, the serviceable life of the diaphragm 92 could even be reduced.

Referring to FIG. 6C, which shows a schematic view of heat source areas of the valve body 9, wherein the heat source areas include a valve box heat source area 140*a*, a flow channel heat source area 140*b*, an inlet pipe heat source area 140*c*, an outlet pipe heat source area 140*d*, an inlet connection heat source area 140*e*, and an outlet connection heat source area 140*f*. A high temperature liquid passes through pipes, structures, and the diaphragm 92, and then transmitted outward. The peripheral portion 921 of the diaphragm 92 is close-fitted to the flow channel heat source area 140*b*. The annular portion 915 of the valve body 91 and the tightening portion 934 of the upper valve body 93 are all the main paths for outward heat transmission from the heat source areas, resulting in the annular portion 915 and the peripheral portion 921 of the diaphragm 91 become the positions most easily distorted by heat, resulting in leakage, whereby the heat passes through a heat transfer path 14, and then through the valve body 91, the upper valve body 93, and the valve upper cover 94, resulting in reduction in the structural strength and tightening force of the gas cylinder structure.

Referring to FIG. 6B and FIG. 6D, which show schematic views of heat transfer paths of the diaphragm valve 9, and descriptions of the heat transfer paths are provided below. Valve shaft heat transfer paths 141 transmit heat from the valve box 913 directly to the central portion of the diaphragm 92 and then toward the valve shaft 95. Square plate heat transfer paths 142 transfer heat from the outlet pipe heat source area 140*d* and the inlet tube heat source area 140*c*, then along the accumulated thickness 9163, and from the flow channel heat source area 140*b* passes through the flow channel side wall 9134 and the seal groove 9133, whereupon the heat is finally transmitted towards the annular portion 915 and the upper valve body 93. The inlet connection heat source area 140e and the outlet connection heat source area 140f of connector heat transfer paths 143 transmit heat to the annular portion 915 through the square portion 916. Annular portion heat transfer paths 144 will upwardly transmit heat to the upper valve body 93 and the valve upper cover 94, and concurrently a portion of the heat will be transmitted from the upper valve body 93 to the shaft hole portion 935. Shaft hole portion heat transfer paths 145 branch off to the shaft hole portion 935 from the annular wall heat transfer paths 143, and then transmitted to the valve shaft 95. Square portion heat transfer paths 146 transfer heat from the outlet pipe heat source area 140d and the inlet tube heat source area 140c, then transmitted along the longitudinal vertical ribbed plates 9162 to outside the square portion 916. The thickness of the flow channel side wall 9134 is provided with the seal groove 9133, and can also be assembled with a fixing ring of higher hardness, which enables the thickness of the flow channel side wall 9134 to have an even greater transmission area that accentuates the quantity of heat in the square plate heat transfer path 142. Because each of the heat source areas of the present reference example 1 has a large heat transfer sectional area, an even greater amount of heat is transmitted to the entire diaphragm valve structure, which causes high temperature structural creeping and distortion, as well as resulting in reduction in the tightening force of the four metal bolts.

Referring to FIG. 6E, which shows a schematic view of heat dissipation of the diaphragm valve 9, and descriptions of natural heat dissipation paths are provided below. Square portion heat dissipation paths 151 of the valve portion 90a dissipate heat through square portion ribbed plates 152, and the actuation gas cylinder is provided with upper valve body heat dissipation paths 153 and valve upper cover heat dissipation paths 154, which respectively dissipate heat through the upper valve body 93 and the valve upper cover 94. using natural convection on exterior surfaces to dissipate heat; however, the heat dissipation effectiveness is not noticeable. The square portion 916 is a perpendicular gastight structure, and the majority of heat source areas are positioned in the interior of the square portion 916, which means its very difficult to dissipate the heat outward. The heat will pass through the square plate 9161 and enter the annular portion 915 and the valve shaft 95, thereby increasing the temperature of the upper valve body 93, resulting in the tightening force of the four support bolts of the gas cylinder structure failing. The fluororesin O-rings on the valve shaft 95 and the piston 953 are also unable to maintain functionality due to wear and tear; moreover, concentricity and perpendicularity of the valve shaft 95 will be a problem. The tightening portion 934 is also unable to produce an effective tightening force on the peripheral portion 921 of the diaphragm 92, resulting in leakage. In addition, the leaking liquid will pass through an adjacent lower sealing face and flow to the bolt sleeves and metal bolts producing a corrosion reaction, the reactants from which will diffuse and flow back to enter the flow channel 9132 and contaminate the liquid.

The characteristics of the present reference example 1 include: the added thickness of the upper edge of the flow channel side wall 9134 passes through the center opening of the square plate 9161, and the seal groove 9133 is provided in the upper edge of the flow channel side wall 9134. The annular portion 915 connects with the external ring surface of the flow channel side wall 9134, and also connects to the upper surface of the square plate 9161, and a fixing groove provided in the peripheral portion 921 of the diaphragm 92 enables assembling a fixing ring of higher hardness. The fixing ring enables maintaining the roundness of the seal groove 9133 and also effectively sustains the tightening force of the tightening portion 934, as well as increase the supporting force by means of the thick wall of the flow channel side wall 9134 and stabilize the peripheral portion 921 of the diaphragm 92 so as not to be affected by high temperature distortion. The characteristics of the present invention 1 substantially improve on problems related to high temperature distortion of the outer edge of the cup-shaped structure of the valve body 91 and leakage from the peripheral portion 921, to achieve application at an operating temperature reaching as high as ≤160° C., see FIG. 3 of the Fluid Control Valve invention of the prior art as disclosed in Japanese Patent No. JP2009002442 (A).

A fixing ring of higher hardness is assembled on the peripheral portion 921 of the diaphragm 92 of the present reference example 1, however, the fixing ring only enables maintaining the roundness of the seal groove 9133 at temperatures below 160° C., and does not resolve the problem of the valve body 91 being subjected to the pressure at the inlet pipe 911 and the outlet pipe 912, resulting in distortion. When the inlet pipe 911 and the outlet pipe 912 are full with high temperature, high pressure liquid causing distortion thereof, consequently, the square plate 9161 will also be distorted accordingly by the inlet pipe 911 and the outlet pipe 912, thereby connectively affecting roundness of the flow channel side wall 9134, and affecting the gas-tight seal of the diaphragm 92. When the temperature exceeds 160° C. up to a temperature of 200° C., the above-described distortions become more severe and gas-tight seals cannot be maintained.

Referring to FIG. 6F, which shows the structure of another reference example of the prior art that still has the valve body 91 but is not provided with a complete structure for the square portion 916, and is named a second valve body, that is, the structure is only fitted with the square plate 9161 that is provided with four bolt holes for tightening use. The outlet pipe 912, the inlet pipe 911, a flow channel, inlet connection, and an outlet connection are all partially exposed to the exterior, and is named a second molded square portion structure. Moreover, the upper sides of the outlet pipe 912 and the inlet pipe 911 are both next to the square plate 9161, and there still exists a large area of the accumulated thickness 9163. This type of structure can decrease the inlet connection heat source area and the outlet connection heat source area, and also adds to direct heat dissipation from external surfaces, which enable eliminating the problem of heat accumulating in the square portion 916. However, the accumulated thickness area 9163 still supplies a large surface heat transfer, with the heat being transmitted to the annular portion 915, the upper valve body 93, the valve upper cover, and the valve shaft 95. This type of second molded square portion structure still does not improve on existing problems, that is, the external edge height of the cup-shaped structure is approximately 6 mm. which is unable to provide sufficient structural strength, with the cup-shaped structure lacking the support of square longitudinal vertical ribbed plates 9162. When the inlet pipe 911 and the outlet pipe 912 are full with high temperature, high pressure liquid causing distortion thereof, consequently, the square plate 9161 will also be distorted accordingly by the inlet pipe 911 and the outlet pipe 912, thereby connectively affecting roundness of the flow channel side wall 9134, and affecting the gas-tight seal of the diaphragm 92. Hence, this type of structure only has application at relatively low operating pressures and temperatures; for example, an operating pressure of 3 kg/cm² and operating temperature of <100° C. If it is required to satisfy a normal temperature and operating pressure of 5 kg/cm², then the thickness of the annular portion 915 must be increased and the external edge height of the cup-shaped structure raised. However, such modifications would result in the problem of a large heat transfer area. When assembling the pipe connections, the second valve body lacks the square portion 916 that facilitates fixing, thus, the degree of difficulty during the fixing operation will greatly increase during construction.

Descriptions of scenarios to resolve the above-described problems 1 to 4 using reference example 1:

Problem 1: Heat transfer restriction. A wide diameter channel accumulated thickness area is reserved between the square plate and the inlet pipe and the outlet pipe. However, such a large heat transfer area will result in substantial heat transfer to the annular portion and the upper valve body. Moreover, thickness of the flow channel side wall will also substantially increase the heat transmission area. A fixing ring additionally installed on the peripheral portion of the diaphragm will also increase the heat transmission area, and the four metal bolts and bolt sleeves near to the annular portion will also transmit a large amount of heat.

Problem 2: Natural cooling. Natural cooling is only provided using surface area natural cooling, with the upper valve body and the valve upper cover only providing surface area natural heat dissipation. The lattice-shaped perpendicular ribbed plates of the first molded square portion are completely unable to effectively dissipate heat, which results in a continuous accumulation of heat inside the diaphragm valve causing the entire structure to be at a high temperature. Moreover, the lattice-shaped perpendicular ribbed plates of the second molded square portion are completely unable to effectively dissipate heat.

Problem 3: Internal cooling. The structure lacks an internal mechanism for the import of an external gas coolant, thus, the valve shaft set is not cooled.

Problem 4: Tightening and sealing. The annular portion, the tightening portion, the diaphragm peripheral portion, and the diaphragm center all have heat being continuously transmitted therethrough. In addition, the heat is continuously accumulated inside the gas cylinder structure, causing the entire gas cylinder structure to be at a high temperature, resulting in an increase in structural creeping and distortion, consequently causing the four tightening metal bolts to become loose. The gas chamber is positioned on the valve body, and reciprocating motion of the piston together with the gas chamber pressure directly apply force on the upper valve body, which easily cause the tightening portion of the upper valve body to unable effectively tighten the peripheral portion of the diaphragm. The square plate tightly connected to the inlet pipe and the outlet pipe still has an accumulated thickness, thus, when the inlet pipe and the outlet pipe are full with high temperature, high pressure liquid causing distortion thereof, the square plate will also deform accordingly; moreover, roundness of the flow channel side wall cannot be maintained. Hence, the present reference example only improves on distortion of the outer edge of the cup-shaped structure. In conclusion, the diaphragm valve is only able to operate at temperatures below 160° C., and is unable to meet the requirements for operating at high temperatures less than 200° C. The second valve body lacks the support of the ribbed plates of the square portion, thus, the diaphragm is only able to satisfy the needs of an operating environment at a normal temperature and operating pressure of 3 kg/cm².

Reference Example 2

The 1996 Japanese Patent No. JPH08152078 (A) discloses a gas-Operated Valve, which is provided with a linear magnetic structure able to detect opening of a diaphragm. The structure in this reference patent is suitable for applications at normal temperature but is unsuitable for applications at high temperatures. However, the exterior exposed pipe connections of the structure have no inlet connection heat source areas or outlet connection heat source areas; the structure has relatively small inlet pipe heat source areas and outlet pipe heat source areas. Compared to other prior art structures, the present reference patent has the characteristic of having heat source areas that are relatively small. However, the inlet pipe and outlet pipe still have large accumulated thickness areas, which form heat transfer channels that directly connect with the annular portion of the square plate. The upper valve body of the present reference example uses threaded teeth to tighten on the outer side of the annular portion of the valve body, which shrinks the heat transfer sectional area of the annular portion. An annular member used to securely fix the diaphragm is tightened on the inner side of the annular portion and has a large heat transfer sectional area. The upper side of the diaphragm central portion also still has a large heat transfer area, that is, such a structure lacks a heat source separation design. The center of the valve upper cover is provided with an actuation gas connection connected to actuation gas guide holes in the center of the valve shaft, which enable gas to penetrate into the interior of the gas cylinder and reach one side of the piston, which is used to drive the piston. However, the gas holes are not able to be used to satisfy the cooling requirements of the valve shaft, and the structure does not provide a design mechanism to carry out forced cooling. Regarding a heat dissipation mechanism, the valve body is directly exposed to the gas to directly achieve natural cooling, but lacks a high temperature gradient design. The 1992 Japanese Patent No. JPH04181079 (A) discloses a Pneumatic Operating Valve, which also comprises a similar valve shaft of the prior art fitted with actuation gas guide holes.

Descriptions of scenarios to resolve the above-described problems 1 to 4 using reference example 2:

Problem 1: Heat transfer restriction. The annular portion and the diaphragm peripheral portion are separated, thus, the heat transmitted through the annular portion is not centralized in the peripheral portion of the diaphragm. The annular member used to securely fix the diaphragm still has a large heat transfer area, and the upper side of the diaphragm central portion also still has a large heat transfer area, resulting in a large amount of heat being transmitted from the diaphragm.

Problem 2: Natural cooling. The diaphragm has the problem of a large transmission of heat, and is only provided with surface natural cooling that is unable to effect large heat dissipation to maintain a temperature gradient.

Problem 3: Internal cooling. The structure lacks a mechanism for the import of an external gas coolant, and the actuation gas guide holes at the shaft center only contribute to cooling the valve shaft, and do not contribute to cooling the diaphragm.

Problem 4: Tightening and sealing. The annular member is fixedly tightened on the inner side of the annular portion, and is used to tighten the peripheral portion of the diaphragm, which increases the tightening effectiveness of the upper valve body and reduces the affect of the reciprocating motion of the piston on the tightening of the diaphragm.

Reference Example 3

The 1997 Japanese Patent No. JPH09217845 (A) discloses a Diaphragm Valve, and describes a normally closed diaphragm valve structure attached with shock absorbing springs. The structure in this reference patent is suitable for applications at normal temperature but is unsuitable for applications at high temperatures. Normally closed springs are fitted on the upper side of the piston to ensure the diaphragm is able to press down on the valve seat. And secondary springs fitted on the lower side of the piston enable the diaphragm to smoothly close when closing, which substantially reduce the possibility of the valve seat producing friction particles.

The reference example 3 is suitable for use in normal temperature applications, and apart from resolving problems 1 to 4, it also resolves the above-described problems 5 and 6. Descriptions of scenarios to resolve problems 1 to 6 are provided below:

Problem 1: Heat transfer restriction. The structure has large accumulated thickness area; moreover, the inlet and outlet pipe connections are also connected to the accumulated thickness area. The annular portion is provided with an even larger heat transmission area at the diaphragm peripheral portion. The thickness of the flow channel side wall also substantially increases the heat transfer area, and the four metal bolts and bolt sleeves will also transmit a large amount of heat. Under a high operating temperature, these heat areas transmit the heat to the upper valve body, reducing structural strength and producing serious structural creeping and distortion.

Problem 2: Natural cooling. The structure is only provided with external surface natural cooling, but with no specific cooling scenario, and lacks a high temperature gradient design.

Problem 3: Internal cooling. The structure lacks a mechanism for the import of an external gas coolant, Problem 4: Tightening and sealing. When used at normal temperatures, the structure does not take into consideration the problem of continuous accumulation of heat inside the diaphragm valve, and does not take into consideration high temperatures that results in the problem of structural creeping and distortion.

Problem 5: Vibration damper device. Reciprocating motion of the piston and the counteracting forces of springs produce vibration, and after a long period of operation, structural creeping and distortion will cause reduction in the degree of tightness in the structure. The present reference example 3 uses springs to reduce vibration to prevent leakage in the diaphragm; moreover, reducing vibration also decreases production of friction particles.

Problem 6: Friction particles. The present reference example 3 does not use any special design to prevent high temperature distortion of the valve body, upper valve body, and valve upper cover, especially when operating at 200° C. Moreover, the structure is unable to ensure concentricity and perpendicularity of the valve shaft to reduce friction particle production.

Reference Example 4

The 2015 Chinese Patent No. CN104633171 (A) discloses a Valve Apparatus, the structure of which is suitable for applications at normal temperatures but is unsuitable for applications at high temperatures. The valve structure has conductive material installed in the valve shaft center, and the conductive material is able to contact channeling liquid to remove static electricity on the diaphragm. When the valve structure is channeling nonconducting high-purity water or other nonconducting liquid, the nonconducting diaphragm and valve body will accumulate frictional static electricity; and when the high voltage static electricity on the diaphragm is discharged to the upper valve body, the diaphragm will be punctured and damaged. The conductive material on the valve shaft is generally a heat conductor, which easily transmits heat from the valve box to other structures, and, thus, an imperfect heat source separation design. The 2010 Japanese Patent No. JP2010121689 (A) discloses a Diaphragm Valve, which describes installing conducting material on the diaphragm non-contact liquid side.

The structures of the above-described two reference patents are both suitable for applications at normal temperatures, and apart from resolving the above-described problems 1 to 4, the structures also resolve problems 5 and 7. Descriptions of scenarios to resolve the above problems are provided below:

Problem 1: Heat transfer restriction. Each of the structures has a large accumulated thickness area, and the inlet and outlet pipe connections are connected to the accumulated thickness area. The thickness of the flow channel side wall also substantially increases the heat transmission area. The diaphragm central portion also has a large heat transfer area.

Problem 2: Natural cooling. The structures are only provided with external surface natural cooling, with no specific cooling scenario, and lack a high temperature gradient design.

Problem 3: Internal cooling. The structures lack a mechanism for the import of an external gas coolant.

Problem 4: Tightening and sealing. The upper valve body is tightly screwed onto the valve body, and the valve upper cover is tightly screwed onto the upper valve body. The upper valve body directly sustains the movement of the piston and the counteracting forces of springs, as well as high pressure actuation gas pressure, which will affect the tightening force of the upper valve body on the peripheral portion of the diaphragm.

Problem 5: Vibration damper device. The upper valve body of the present reference examples are installed with elastic rubber to reduce vibration to prevent leakage in the diaphragm.

Problem 7: Eliminating static electricity. Conductive material installed in the valve shaft center is advantageous for the conduction of static electricity; however, the conductive material is disadvantageous for heat source separation. The static electricity channeling mode described for the Diaphragm Valve in Japanese Patent No. JP2010121689 (A) avoids the problem of heat transmission.

Reference Example 5

The 2003 U.S. Pat. No. 6,612,538 (B2) discloses a Two-way valve, the structure of which is suitable for applications at normal temperatures but unsuitable for applications at high temperatures. The structural method used in the present reference example 5 provides a metal thread on the center valve shaft, and uses the metal thread to firmly tighten the diaphragm on the valve shaft. The two ends of the upper valve body are respectively provided with tight locking threaded teeth, which are used to tightly lock the upper valve body onto the valve upper cover and achieve connection therewith, thereby enabling the external surface of the valve to be absent of metal bolts and, thus, preventing corrosion from surrounding gas. The present reference example 5 is further installed with a rotatable annular member, which is used for assembling an actuation gas connection, enabling the disposition of a high pressure actuation gas pipe even more convenient. The annular member enables gas-tight sealing the valve body to the valve upper cover. The upper valve body of the present reference example is installed with a shock absorbing member to reduce vibration from piston movement to prevent the upper valve body from coming loose from the threaded teeth on the upper valve body. The annular member installed on the present reference example is an important characteristic, however, in actual practice, the high pressure gas piping must be fixed to the surrounding gas pipe duct structure. Moreover, these pipes are all configured in a fixed direction, hence, such a structural device does not improve on the practicality of a valve. In addition, additional gas-tight sealing is required, and, thus, disadvantageous for applications at high temperatures; moreover, even the addition of more components will bring about the risk of even more structural creeping. The outlet and inlet pipes each have a large accumulated thickness area that form heat transfer channels directly connected to the annular portion of the square plate. Diaphragm outer O-rings are installed above the flow channel side wall, and the upper valve body is locked tight on the inner side of the annular member and tightens the diaphragm outer O-rings. In addition, the outer O-rings on the outer side of the diaphragm each have a large heat transfer area, the metal thread on the valve shaft causes loss of heat source separation, and is unable to establish a high temperature gradient. The annular portion of the valve body and the tightening portion of the upper valve body are the main heat source areas providing paths for outward heat transmission; moreover, the annular portion and the accumulated thickness area form heat transfer channels. Under a high operating temperature, these heat areas transmit the heat to the upper valve body and reduce structural strength, producing serious structural creeping and distortion. The central portion of the diaphragm has a large area that absorbs and channels heat into a liquid, and a large amount of heat is transmitted to the valve shaft. The metal thread on the center valve shaft forms a channel for high-speed heat transfer. Fluororesin O-rings contact the valve shaft, which will cause the gas-tight seal function failing under conditions of an operating temperature exceeding 160° C., and the center metal shaft is still the cause of a leaking diaphragm problem, resulting in metallic corrosion and contamination problems. The peripheral portion of the diaphragm is a large heat source problem, with no specific cooling scenario, and is also unable to establish a high temperature gradient.

Descriptions of scenarios to resolve problems 1 to 4 using reference example 5 are provided below:

Problem 1: Heat transfer restriction. The structure has a large accumulated thickness area; moreover, the inlet and outlet pipe connections are also connected to the accumulated thickness area. The thickness of the flow channel side wall will also substantially increase the heat transmission area. The annular portion structure has a large heat transfer area, and the central portion of the diaphragm also has a large heat transfer area.

Problem 2: Natural cooling. The structure is only provided with external surface natural cooling, with no specific cooling scenario, and lacks a high temperature gradient design.

Problem 3: Internal cooling. The structure lacks a mechanism for the import of an external gas coolant.

Problem 4: Tightening and sealing. The structure avoids using four metal bolts for lock tightening the exterior of the diaphragm valve that would suffer from corrosion by surrounding corrosive gas, resulting in the threads coming loose or even breaking, further resulting in an inadequate tightening force on the diaphragm valve and producing substantial leakage. The upper valve body is locked tight onto the valve body, and the valve upper cover is locked tight onto the upper valve body; moreover, the upper valve body directly sustains the movement of the piston and the counteracting forces of springs, as well as high pressure actuation gas pressure, which would affect the tightening force from the upper valve body on the peripheral portion of the diaphragm. A rotatable annular member is assembled between the valve body and the valve upper cover, and the external ring surface of the upper valve body provides gas-tight seal functions, which increases the risk of the upper valve body loosening.

Reference Example 6

The 2014 Chinese Patent No. CN103717954 (A) discloses a Fluid control valve, the structure of which is suitable for applications at high temperatures. The actuation gas cylinder of the present reference example 6 comprises an upper valve body, and this configuration is named a gas cylinder body. The present patent is characterized in that: a contracted neck portion is configured between the gas chamber and the valve body, and a butt connect surface is positioned between the valve portion and the actuation gas cylinder that is used to tighten the peripheral portion of the diaphragm. The butt connect surface at a partial portion of the valve body is named an annular portion. The contracted neck portion is configured on a contracted sectional area of the gas cylinder body, and a lower side of the contracted neck portion is configured with a disc-shaped flange, which is used to fix the valve body and a metal mounting plate using metal bolts, enabling the diaphragm peripheral portion on the mounting plate and the disc-shaped flange to clamp down and maintain a tightening force. In addition, a coolant gas connection is assembled on the non-liquid contact side of the diaphragm, and connects to a gas vent of the gas cylinder through a center hole of a shaft, the objective of which is to enable operation at high temperatures ranging from 200° C. to 250° C. A preferred embodiment of the present reference example 6 is a valve portion made from fluororesin, and apart from a gas-tight component, the actuation gas cylinder is made from metal material. The heat energy produced by the valve main body is limited to passing through the annular portion and transmitting to the disc-shaped flange, and the heat transmission path is further limited by the reduced sectional area of the contracted neck portion. Hence, heat cannot be effectively transmitted to the actuation gas cylinder, and with the addition of an external gas coolant, there is no worrying problem that the structure is unable to effectively ensure high temperature operation. Nonetheless, a large amount of structural creeping will occur using a valve portion made from fluororesin material operating at temperatures exceeding 200° C. However, the annular portion of the valve body is clamped by means of the mounting plate and the disc-shaped flange, and metal bolts locking tight on the mounting plate are unaffected by high temperatures, thus, structural creeping produced by the valve body will not cause loosening of the metal bolts.

The first claim of the patent application of the present reference example 6 does not disclose use of metal materials. However, in actual practice, the specification does not disclose a description of data that enables a structure made completely from fluororesin material to achieve operation at the alleged 250° C., because a large amount of structural creeping occurs when fluororesin reaches a temperature of 200° C. Moreover, a metal diaphragm valve with a contracted neck structure for use at high temperatures is a commonly seen design in the prior art. The 2001 US Patent No. US2001028049 (A1) discloses a High-temperature gas control valve, and the 2017 Taiwan Patent No. TW201702508 (A) discloses a Diaphragm Valve. Both of these inventions describe similar contracted neck designs; moreover, the shaft center has actuation gas holes that enable achieving a similar cooling effect.

The above-described reference example 6 that uses a structure made completely from fluororesin material still has the following problems:

Problem 1: Heat transfer restriction. The peripheral portion of the diaphragm is close-fitting to the flow channel heat source area, resulting in the seal groove of the annular portion and the periphery of the diaphragm both becoming positions most easily distorted by heat, causing leakage. Moreover, the annular portion of the valve body becomes a main path for transmitting heat, and the heat is accumulated on the non-metal disc-shaped flange. Although the non-metal mounting plate is able to assist in maintaining a tightening force on the diaphragm periphery, however, the risk of high temperature structural distortion resulting in leakage is still high. The contracted neck portion of the upper valve body provides a substantially effective heat transfer restriction area, which easily causes high temperature distortion of the fluororesin structure.

Problem 2: Natural cooling. The peripheral portion of the diaphragm is close-fitting to the flow channel heat source area, resulting in the seal groove of the annular portion and the periphery of the diaphragm both becoming positions most easily distorted by heat, causing leakage. The valve body and the upper valve body portions rely on surface natural heat dissipation, and are unable to ensure structural strength of the contracted neck portion made completely from fluororesin, as well as being unable to maintain concentricity and perpendicularity of the valve shaft.

Problem 3: Internal cooling. The structure is provided with a mechanism for the import of an external gas coolant, a coolant gas connection is fitted on the non-liquid contact side of the diaphragm, and connects to a vent hole of the gas cylinder through a center hole of a shaft. Such a configuration is unable to provide further cooling for the peripheral portion of the diaphragm.

Problem 4: Tightening and sealing. The fluororesin disc-shaped flange and non-metal mounting plate are able to sustain a greater amount of heat before distorting. Hence, because of this, the lock tightening bolts will become loose, and also cause reduction in the tightening force of the diaphragm peripheral portion. High temperatures will also enable back and forth vibration in the actuation gas cylinder to directly cause structural distortion of the contracted neck portion.

Reference Example 7

The 2004 Japanese Patent No. JP2004019792A discloses a TRANSMISSION GAS DISCHARGE STRUCTURE OF DIAPHRAGM VALVE, which resolves the problem of an infinitesimal amount of fluid permeating and passing through the diaphragm, resulting in continuous accumulation on the backside of the diaphragm. However, this continuous accumulation of corrosive fluid will damage the internal components of the valve. The structure in the present reference patent uses four lock tightening bolts that together lock tighten the valve body, upper valve body, and valve upper cover. An internal holding chamber of the valve upper cover is an actuation gas cylinder, and is provided with an actuation gas connection. The piston of the valve shaft performs a reciprocating motion in the gas chamber inner, the upper valve body is provided with two inter-connecting cleaning gas guide holes and connectors on the non-liquid contact side of the diaphragm, wherein one of the connectors is an inlet connector and the other is an outlet connector, which are able to eliminate the accumulated permeating fluid. Reference example 7 only eliminates the accumulated fluid on the backside of the diaphragm, but does not propose any specific design for use in high temperature conditions. However, the design of cleaning gas guide holes can be used for cooling the diaphragm and valve shaft in high temperature applications. Nonetheless, the structure still does not satisfy the cooling requirements of the diaphragm periphery. Because the position of the outlet pipe is higher than the inlet tube, thus, the valve box is provided with a flow channel design, but uses added thickness to the annular portion. In addition, the inner side of the opening is provided with a seal groove, which is used to assemble the peripheral portion of the diaphragm that results in a large heat source from the valve box, which is transmitted upward through the annular portion and the valve shaft.

When used at high temperatures, the above-described reference example 7 still has the following problems:

Problem 1: Heat transfer restriction. The peripheral portion of the diaphragm is close-fitting to the flow channel heat source area, resulting in the seal groove of the annular portion and the peripheral portion of the diaphragm becoming the positions most easily distorted by heat and leaking. Moreover, the upper valve body has a large heat transfer area, which causes heat accumulation. Four metal bolts and bolt sleeves also transmit a large amount of heat, thus, the risk of high temperature distortion of the entire structure and leakage is still high;

Problem 2: Natural cooling. The peripheral portion of the diaphragm is close-fitting to the flow channel heat source area, resulting in the seal groove of the annular portion and the peripheral portion of the diaphragm becoming the positions most easily distorted by heat and leaking. The valve body relies on surface natural heat dissipation, and is unable to maintain structural strength of the annular portion at high temperatures, and cannot sustain concentricity and perpendicularity of the valve shaft.

Problem 3: Internal cooling. The structure is provided with a mechanism for the import of an external gas coolant, the upper valve body is provided with two inter-connecting purgative gas guide holes and connectors on the non-liquid contact side of the diaphragm, wherein one of the connectors is an inlet and the other connector is an outlet, which are able to eliminate accumulated liquid that has permeated the diaphragm. This type of device has application for cooling the diaphragm and valve shaft, thereby reducing the temperature thereof. However, the structure is unable to provide further cooling for the peripheral portion of the diaphragm.

Problem 4: Tightening and sealing. The annular portion is able to sustain a greater amount of heat before distorting, but is unable to establish a high temperature gradient, and because of this, the lock tightening bolts will become loose, and also cause reduction in the tightening force of the diaphragm peripheral portion, From the above-described reference examples 1 to 7 and discussion of problems 1 to 4, diaphragm valves made from fluororesin material of the prior art are completely unable to satisfy requirements for operating at the high temperature of 200° C., and the liquid channeling of corrosive liquids, such as hydrofluoric acid, hydrochloric acid, sulfuric acid, and the like.

SUMMARY OF THE INVENTION

The present invention provides improvements on the shortcomings of fluororesin material that easily causes structural creeping at 200° C. A diaphragm valve made from fluororesin is assembled from a valve portion and an actuation gas cylinder, wherein the valve portion comprises components including a valve body and a diaphragm. The actuation gas cylinder comprises components including an upper valve body, a valve upper cover, a valve shaft, and part of a valve body structure. The actuation gas cylinder further comprises a gas cylinder structure, and also comprises an actuation gas connection and a coolant gas connection. The gas cylinder structure is assembled from the valve upper cover disposed gastight on the valve body. The interior of the gas cylinder structure contains components including a valve shaft set and springs, which construct the actuation gas cylinder. The gas cylinder structure is provided with a gas chamber, which is separated by a piston of the valve shaft set into an upper gas chamber and a lower gas chamber. The valve shaft set structure comprises and is assembled from the diaphragm, the valve shaft, and the upper valve body. The tail end of the valve shaft penetrates a center through hole of the valve upper cover. Because of the different structures of diaphragm valves, the gas chamber is installed on an annular portion or the valve upper cover.

The valve body is provided with an inlet pipe, an outlet pipe, a valve box, an annular portion, and a square portion.

Heat source areas of the diaphragm are positioned on the valve body and include a valve box heat source area, a flow channel heat source area, an inlet pipe heat source area, an outlet pipe heat source area, an inlet connection heat source area, and an outlet connection heat source area. A high temperature liquid is outward transmitted through the outlet pipe, the square portion, the annular portion, the upper valve body, and the diaphragm.

The valve box comprises a valve seat and a flow channel. The diaphragm is provided with a peripheral portion, an elastic strip, and a central portion. The peripheral portion enables completely sealing of the valve box, and the central portion acts as a switch corresponding to the valve seat.

The valve shaft is provided with a locking portion, a hollow shaft rod, an axis hole, and a piston portion. The locking portion is used to tightly lock the central portion of the diaphragm. The hollow shaft rod passes through a shaft hole portion of the upper valve body, and is sealed by a plurality of O-rings.

The annular portion forms an open ring structure, and comprises a sealing face, an opening portion, an internal ring surface, a minimum diameter area, and an external ring surface. The internal ring surface is provided with a seal groove and an O-ring groove, The square portion comprises a square plate, a plurality of longitudinal vertical ribbed plates, a plurality of transverse vertical ribbed plates, and a plurality of horizontal ribbed plates, which construct a lattice-shaped ribbed plate structure with horizontal openings. The longitudinal vertical ribbed plates are connected to the lower side of the square plate and the upper sides of the inlet pipe and the outlet pipe, as well as connecting to the flow channel. An opening in the middle of the square plate is used to contain the valve box and connects to the side wall of the flow channel.

The upper valve body is provided with an external ring surface, an internal ring surface, a tightening portion, the shaft hole portion, and a diaphragm chamber. The upper valve body is installed on the annular portion, and the tightening portion is used to tighten the peripheral portion of the diaphragm into the seal groove of the annular portion. The upper valve body is assembled on the internal ring surface of the annular portion, and assumes a central pyramidal, convex open cup-shaped structure.

The valve upper cover is provided with an internal holding chamber, a top portion, a center through hole, the external ring surface, and a sealing face. the valve upper cover is installed on the upper side of the annular portion.

The annular portion and the valve box construct a cup-shaped structure, the opening portion of which is made gastight by the diaphragm. The cup-shaped structure contains a high temperature liquid and endures the liquid pressure therefrom. The cup-shaped structure assumes a deep cup shape, with a height range of the outer edge thereof achieving a height of 80% to 160% of that of the upper valve body. Further, the diaphragm is assembled at a position close to the bottom portion of the cup-shaped structure, wherein this position is also provided with a cooling flow channel for cooling. Under conditions of high temperature distortion, the annular portion assists in providing high structural strength; moreover, the valve shaft set is assembled on the annular portion, that is, the deep cup-shaped structure provides the valve shaft set with the most stable structural support. When the valve shaft is performing an opening/closing movement, concentricity and perpendicularity is ensured, which provides maximum assistance to reducing particle release.

The structural originality of the present invention is achieved through the structural innovation of the valve body, the gas cylinder structure, and the valve shaft set. The structural originality of the present invention is suitable for different types of diaphragm valve, such as a non-metallic normally closed diaphragm valve, non-metallic normally open diaphragm valve, metallic normally closed diaphragm valve, metallic normally open diaphragm valve, and an electrostatic dissipating normally open diaphragm valve, wherein the electrostatic dissipating diaphragm valve uses a conductive fibre to penetrate the axis hole and clearances of bolt holes. In addition, the conductive fibre is wound around in an annular curved line fashion and bonded to the diaphragm surface. The conductive fibre inside the axis hole is in a fixed state and will not move in correspondence with movement of the valve shaft.

A heat separation method of the present invention comprises a heat transfer restriction method and a heat dissipation method, which are used to separate the heat sources and reinforce heat dissipation to enable maintaining a structural temperature gradient. The heat transfer restriction method of the present invention restricts heat transfer through sectional areas of the structure, hereinafter referred to as heat transfer restriction areas, which are used to reduce the amount of heat being conducted through heat source areas and achieve the object of heat separation.

The heat separation method is achieved using methods comprising a plurality of heat transfer restriction methods and a plurality of heat dissipation methods. The heat transfer restriction methods restrict heat transfer through heat transfer section thicknesses of the structure, which become the heat transfer restriction areas. Using a diaphragm valve with a 1 inch opening diameter as an example, the heat transfer section thicknesses are ≤3 mm. The lattice-shaped ribbed plate structure of the square portion of the present invention is also a heat transfer restriction area. The external side wall of the seal groove of the minimum diameter area of the annular portion is the internal ring surface of the annular portion; the internal side wall of the seal groove is the side wall of the flow channel; and the bottom portion of the seal groove is the square plate, all of which are the heat transfer restriction areas. The external ring surface is fitted with a plurality of perpendicular heat dissipation ribbed plates that connect with the square plate. The heat dissipation ribbed plates are provided with the heat transfer restriction areas. The gas cylinder structure comprises a portion of the annular portion and is positioned above the heat transfer restriction areas of the square plate and the annular portion. The gas cylinder structure uses a plurality of bolt sleeves and a plurality of metal bolts for tightening and gastight sealing thereof. The bolt sleeves and the metal bolts are positioned on the upper side of the minimum diameter area of the annular portion and the upper side of the square plate, as well as being positioned above the heat transfer restriction areas. When the coolant gas connection is installed on the valve upper cover, a plurality of gas columns on the outer side of the gas cylinder structure are positioned on the upper side of the minimum diameter area of the annular portion and the upper side of the square plate, as well as being positioned above the heat transfer restriction areas.

The heat dissipation method comprises an external natural cooling structure and an internal cooling structure. The external natural cooling structure comprises the lattice-shaped ribbed plate structure, ribbed plates of the annular portion, and ribbed plates of the valve upper cover, which provide natural-convection cooling. The internal cooling structure achieves a cooling effect using a coolant gas that passes through a gas coolant flow channel, which comprises one or more than one coolant gas hole in the annular portion connected to a coolant gas ring groove. The coolant gas ring groove is further connected to a plurality of coolant gas guide holes in the tightening portion of the upper valve body. The coolant gas guide holes afford passage to the diaphragm chamber, and the coolant gas passes through the plurality of coolant gas guide holes that connect to the axis hole.

The internal natural cooling uses the rising force of the high temperature coolant gas in the hollow shaft rod to assist the external coolant gas to enter the plurality of coolant gas guide holes of the annular portion to achieve the object of expelling the hot coolant gas from the hollow shaft rod. The internal forced cooling consists of externally forcing high pressure coolant gas from the coolant gas connection to pass through the coolant gas guide holes to enter the coolant gas ring groove, and then through the hollow shaft rod to achieve the internal forced cooling. The coolant gas passing through the coolant gas ring groove of the annular portion passes through a plurality of the coolant gas guide holes of the upper valve body to cool the peripheral portion of the diaphragm, and then flows through the diaphragm space of non-liquid contact to cool the diaphragm. The coolant gas then passes through the axis hole of the hollow shaft rod to carry away the heat transmitted through the central portion of the diaphragm, which is used to ensure gas-tight sealing of the fluororesin O-rings and be unaffected by high temperatures.

The annular portion and the peripheral portion of the diaphragm are the positions most easily distorted by heat, resulting in leakage. The cup-shaped structure assumes a deep cup shape because the height range of the outer edge reaches 80% to 160% of the height of the upper valve body, moreover, the diaphragm is assembled at a position close to the bottom portion of the cup-shaped structure, wherein this position is also provided with a coolant flow channel to effect cooling, thus, under conditions of high temperature distortion, the annular portion assists in providing high structural strength. In addition, the valve shaft set is assembled on the annular portion, that is, the deep cup-shaped structure provides the valve shaft set with the most stable structural support. Hence, concentricity and perpendicularity is ensured when the valve shaft is performing an opening/closing movement, and maximum assistance to reducing particle release is provided. The gas cylinder structure is positioned above the heat transfer restriction areas of the square plate and the annular portion, and comprises a tightening and sealing device on the actuation gas cylinder and other components. As for the external natural cooling, the lattice-shaped ribbed plate structure of the square portion, and a plurality of the heat dissipation ribbed plates of the external ring surface of the annular portion provide substantial natural heat dissipation surfaces to maintain a high temperature gradient. The multilayered ribbed plates with horizontal openings is a structural characteristic of the present invention providing open ventilation, which is able to greatly facilitate natural heat dissipation.

Regarding the internal cooling method, coolant gas in the coolant gas ring groove passes through a plurality of the coolant gas guide holes of the upper valve body to cool the peripheral portion of the diaphragm, and then flows through the diaphragm space of non-liquid contact side to cool the diaphragm. The coolant gas then passes through the axis hole of the hollow shaft rod to carry away the heat transmitted through the central portion of the diaphragm, ensuring the gas-tight sealed fluororesin O-rings are unaffected by high temperatures and ensuring that the entire fluororesin diaphragm valve has application at temperatures reaching as high as 200° C. During natural circulation cooling, the fluororesin diaphragm valve uses the rising force of the hot coolant gas within the hollow axis passage in the valve interior to guide the external gas to enter through one or more than one of the coolant gas holes. During forced circulation cooling, a high pressure coolant gas is supplied to enable improving dependability and durability for application at temperatures reaching as high as 200° C. and in a high corrosive environment.

The present invention also provides a diaphragm valve structure comprising a valve portion and an actuation gas cylinder, wherein the valve portion comprises the fluororesin valve body and the fluororesin diaphragm. The actuation gas cylinder comprises the upper valve body, the valve upper cover, and the valve shaft. The valve body comprises the annular portion and the square portion. The square portion comprises a first side surface, a second side surface, a bottom surface, the inlet pipe, the outlet pipe, and the valve box. The valve box comprises the valve seat and the flow channel. The diaphragm is provided with the peripheral portion, the elastic strip, and the central portion. The upper valve body is installed on the annular portion and tightly locks the diaphragm. The valve upper cover is disposed gastight on the valve body to form the gas cylinder structure. The gas cylinder structure is provided with the gas chamber, which is separated by the piston portion to form the upper gas chamber and the lower gas chamber. The valve shaft comprises the tightening portion, which is used to tightly lock the central portion of the diaphragm. A plurality of the ribbed plates is positioned on any one of, any two of, or all of the first side surface, the second side surface, and the bottom surface.

The present invention also provides a diaphragm valve structure comprising the valve portion and the actuation gas cylinder, wherein the valve portion comprises the fluororesin valve body and the fluororesin diaphragm. The actuation gas cylinder comprises the upper valve body, the valve upper cover, and the valve shaft, wherein the valve body comprises the annular portion and the square portion. The diaphragm is provided with the peripheral portion, the elastic strip, and the central portion. The upper valve body comprises the diaphragm chamber, and the upper valve body is installed on the annular portion and tightly locks the diaphragm. The valve upper cover is disposed gastight on the valve body to form the gas cylinder structure, which is provided with the gas chamber that is separated by the piston portion to form the upper gas chamber and the lower gas chamber. The valve shaft comprises the tightening portion, the hollow shaft rod, and the axis hole, wherein the tightening portion is used to tightly lock the central portion of the diaphragm. The hollow shaft rod is provided with a gas guide hole, which affords passage to the axis hole and also affords passage to the diaphragm chamber. The gas coolant flow channel is configured on the annular portion and links up with the diaphragm chamber.

The present invention also provides a diaphragm valve structure comprising the valve portion and the actuation gas cylinder, wherein the valve portion comprises the fluororesin valve body and the fluororesin diaphragm. The actuation gas cylinder comprises the upper valve body, the valve upper cover, and the valve shaft. The valve body comprises the annular portion and the square portion. The diaphragm is provided with the peripheral portion, the elastic strip, and the central portion. The upper valve body is installed on the annular portion and tightly locks the diaphragm. The upper valve body comprises a first annular recess, and the valve upper cover is disposed gastight on the valve body to form the gas cylinder structure, which is provided with the gas chamber that is separated by the piston portion to form the upper gas chamber and the lower gas chamber. The valve shaft comprises the tightening portion, the hollow shaft rod, and a shock absorption ring. The tightening portion is used to tightly lock the central portion of the diaphragm, and the shock absorption ring is correspondingly assembled on the above-described first annular recess.

The present invention also provides a diaphragm valve structure comprising the valve portion and the actuation gas cylinder, wherein the valve portion comprises the fluororesin valve body and the fluororesin diaphragm. The actuation gas cylinder comprises the upper valve body, the valve upper cover, and the valve shaft. The valve body comprises the annular portion and the square portion. The connecting area between the square portion and the annular portion is provided with a minimum diameter. The annular portion is provided with the internal ring surface, which is configured with the seal groove that is positioned at the minimum diameter area. The diaphragm is provided with the peripheral portion, the elastic strip, and the central portion. The upper valve body is installed on the annular portion and is provided with the tightening portion, which tightly locks the peripheral portion on the position of the seal groove. The valve upper cover is disposed gastight on the valve body to form the gas cylinder structure, which is provided with the gas chamber that is separated by the piston portion to form the upper gas chamber and the lower gas chamber. The valve shaft comprises the tightening portion, which is used to tightly lock the central portion of the diaphragm.

The present invention also provides a diaphragm valve structure comprising the valve portion and the actuation gas cylinder, wherein the valve portion comprises the fluororesin valve body and the fluororesin diaphragm. The actuation gas cylinder comprises the upper valve body, the valve upper cover, and the valve shaft. The valve body comprises the annular portion and the square portion, which comprises the valve box. The annular portion and the valve box construct a deep cup-shaped structure. The diaphragm is provided with the peripheral portion, the elastic strip, and the central portion. The upper valve body is installed on the annular portion and tightly locks the diaphragm. The valve upper cover is disposed gastight on the valve body to form the gas cylinder structure, which is provided with the gas chamber that is separated by the piston portion to form the upper gas chamber and the lower gas chamber. The valve shaft comprises the tightening portion, which is used to tightly lock the central portion of the diaphragm. The external edge height of the above-described cup-shaped structure achieves a height of 80% to 160% of that of the upper valve body. Regarding proposed preferred strategies for the separation of heat sources to deal with the following problems 1 to 4, heat source separation scenarios are described below that are able to satisfy the requirements of applications operating at temperatures reaching as high as 200° C.:

Problem 1: Heat transfer restriction. The flow channel side wall, the square plate, the upper valve body, and the annular portion are all configured with heat transfer restriction areas having cross-sectional area restriction. An inlet pipe connection, an outlet pipe connection, the inlet pipe, the outlet pipe, and the flow channel of the heat source areas are all supported by the lattice-shaped ribbed plate structure of the square portion, thereby limiting the heat transfer areas. Moreover, the outward transmission path of the heat is dispersed to the ribbed plates with horizontal openings. The bottom portions of the first annular recess and the second annular recess are configured with heat transfer restriction areas, and heat transmitted outward from the heat source areas is restricted by the heat transfer restriction areas and thus substantially decreased. Hence, this decrease in heat transfer enables the achievability of natural heat dissipation through the heat dissipation ribbed plates and component surfaces.

Problem 2: Natural cooling. The valve body structure uses a lot of natural heat dissipation surfaces to maintain a high temperature gradient. the multilayered lattice-shaped ribbed plate structure with horizontal openings of the square portion is a structural characteristic of the present invention providing open ventilation, which is able to greatly facilitate natural heat dissipation and to sufficiently maintain a high temperature gradient, as well as enabling ensuring structural strength. When heat is transported to the annular portion, the heat dissipation ribbed plates of the external ring surface provides natural heat dissipation.

Problem 3: Internal cooling. The gas coolant flow channel cools the diaphragm in the interior of the diaphragm valve and the valve shaft, and also strengthens the intrinsic heat source separation effect. The gas used for forced circulation cooling or natural circulation cooling passes through the gas ring groove, and then passes through a plurality of the gas guide holes of the upper valve body to cool the peripheral portion of the diaphragm. The gas then flows through the non-liquid contact side to cool the diaphragm, and finally through the gas guide holes of the hollow shaft rod to enter the center hole to carry away the heat transmitted through the central portion of the diaphragm, ensuring the gas-tight sealed fluororesin O-rings are unaffected by high temperatures, and ensuring that the entire fluororesin diaphragm valve has application at temperatures reaching as high as 200° C. Methods for supplying the gas include natural circulation cooling or external gas forced cooling.

During natural circulation cooling, the rising force of hot coolant gas within the hollow axis passage in the valve interior is used to guide external gas to enter through one or more than one of the gas guide holes.

During forced circulation cooling, high pressure coolant gas passes through a coolant gas connection as the supply entry point to enable improving dependability and durability for application at temperatures reaching as high as 200° C. and in a high corrosive environment.

Problem 4: Tightening and sealing. The valve body and the gas cylinder structure and the structure of the valve shaft set meet the requirements to provide high structural strength, resistance to surrounding corrosive gas, and endurance to the reciprocating motion of the piston.

Regarding the high structural strength, the square portion of the valve is provided with the lattice-shaped ribbed structure with horizontal openings, which provide the structural strength and heat transfer restriction. The annular portion and the valve box construct the cup-shaped structure, which assumes a deep cup shape because the height range of the outer edge reaches 80% to 160% of the height of the upper valve body, moreover, the diaphragm is assembled at a position close to the bottom portion of the cup-shaped structure, wherein this position is also provided with the coolant flow channel to effect cooling, thus, under conditions of high temperature distortion, the annular portion assists in providing high structural strength that is stronger compared to the prior art. The valve shaft set is assembled on the annular portion, that is, the deep cup-shaped structure provides the valve shaft set with the most stable structural support. Hence, concentricity and perpendicularity is ensured when the valve shaft is performing an opening/closing movement, and maximum assistance to reducing particle release is provided. The gas cylinder structure is supported by the structure of the annular portion, ensuring rigid support of the shaft hole portion and ensuring perpendicularity and concentricity of the valve shaft. The external ring surface fitted with heat dissipation ribbed plates provides an additional supporting force for the gas cylinder. The piston transfers the actuation gas pressure and spring vibrations of the gas cylinder to the valve body, the structure of which absorbs and endures, thereby substantially reducing structural loosening resulting from the tightening force producing structural creeping. Moreover, the gas cylinder structure is positioned above the heat transfer restriction areas of the annular portion, and the upper valve body is provided with the heat transfer restriction areas, which are able to minimize heat transmission of the heat source areas and maintain strength of the gas cylinder structure.

Regarding resistance to surrounding corrosive gas, when using a non-metallic structure, the valve upper cover is tightly screwed onto the valve body using threaded teeth, thus removing contamination problems from metallic oxides. When using a metallic structure, the metal bolts of the gas cylinder structure are protected by the bolt sleeves; moreover, only one sealing face has the bolt sleeves, and the height difference value between the sealing face and the peripheral portion of the diaphragm at least equals to more than 80% of the length of the upper valve body. When metallic oxides are diffusing everywhere, such a height difference is sufficient to isolate the contamination permeating problem, and eliminates the need for operators and inspectors to inspect whether or not the bolts are corroded and need replacing, that is, even though the external surface of the valve body is subjected to corrosion by the surrounding corrosive gas, the problem of reduction in the tightening force will not occur.

Regarding endurance to the reciprocating motion of the piston, reciprocating motion of the piston takes place in the gas chamber, and the upper valve body is assembled on the internal ring surface of the annular portion; moreover, the valve body bears the acting force from multiple movements of the piston, therefore, the upper valve body will not distort and loosen. Further, the tightening force will not reduce causing in leakage from the diaphragm, thereby ensuring concentricity and perpendicularity of the valve shaft, and maintaining the tightening force on the peripheral portion of the diaphragm to minimize leakage and extend the serviceable life thereof.

To enable a further understanding of said objectives and the technological methods of the invention herein, a brief description of the drawings is provided below followed by a detailed description of the preferred embodiments.

BRIEF DESCRIPTION OF THE DRAWINGS

FIG. 2B is a schematic view of heat transfer paths of a diaphragm valve of the present invention.

FIG. 4A is a cross-sectional view of a normally closed external threaded tooth bearing set of the present invention.

DETAILED DESCRIPTION OF THE PREFERRED EMBODIMENTS

Figure 1A:
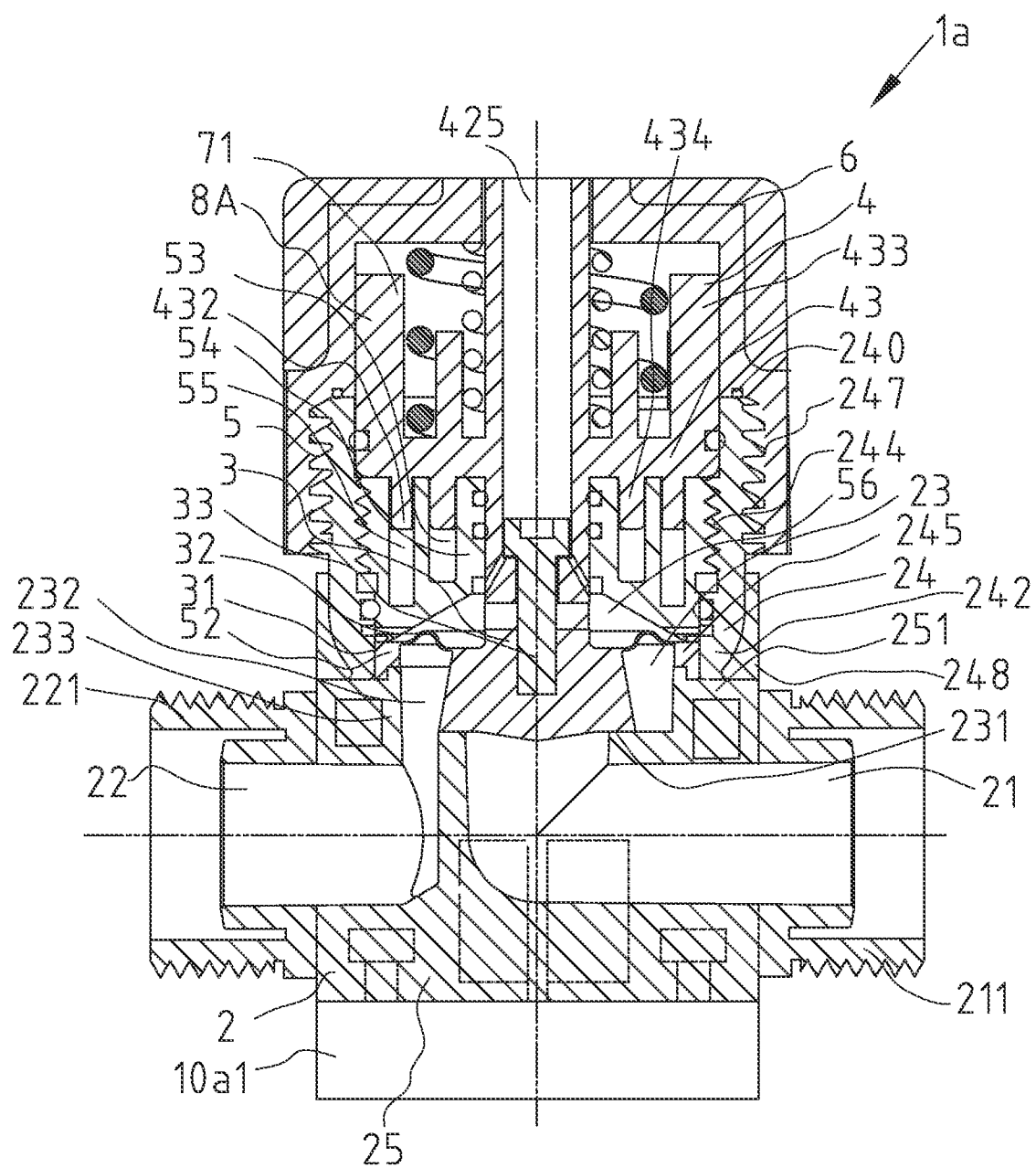
FIG. 1A is a cross-sectional view of a non-metal normally closed diaphragm valve of a first embodiment of the present invention.
Figure 1B:
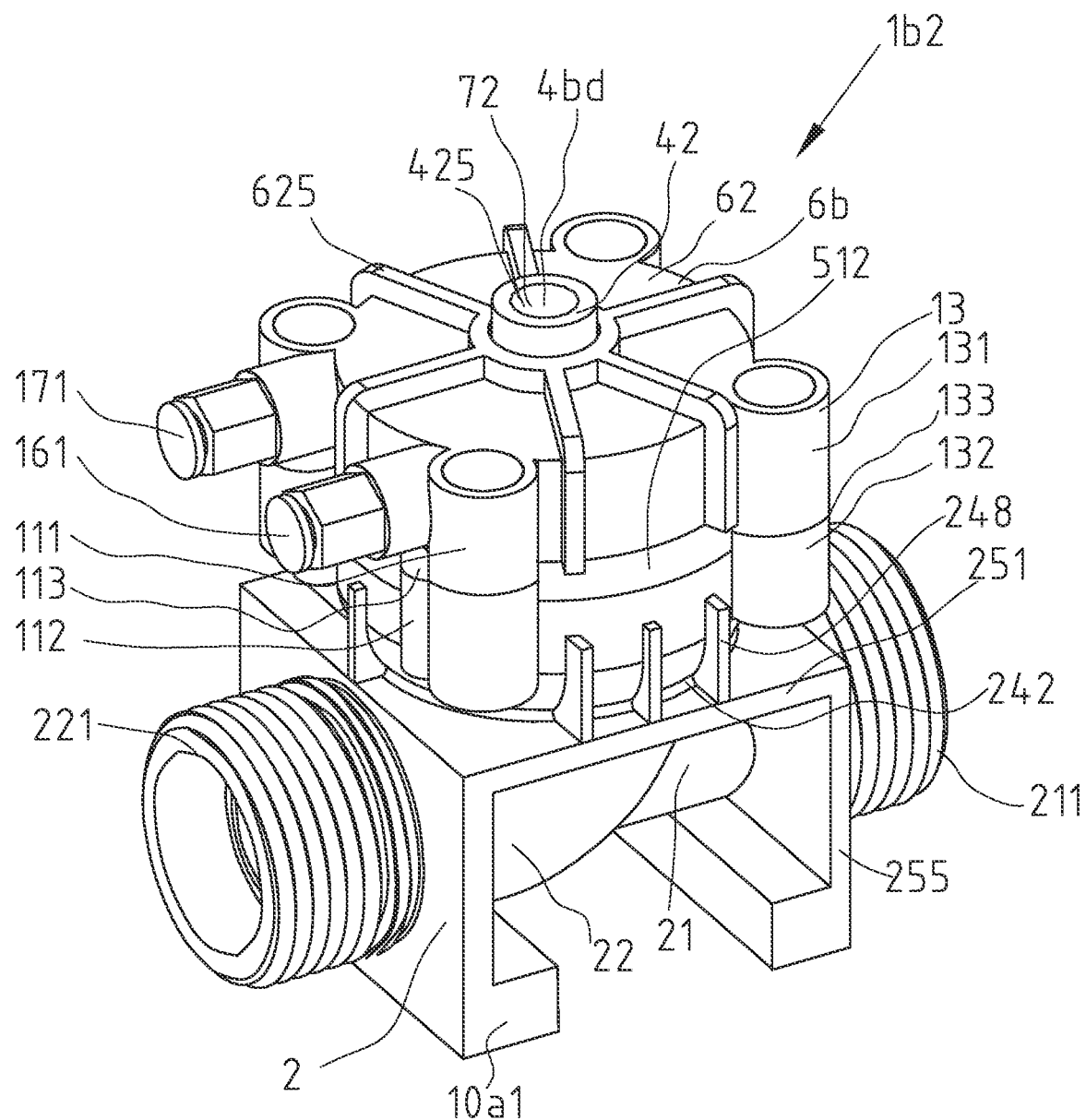
FIG. 1B is a three-dimensional external view of a metallic normally open diaphragm valve of a second embodiment of the present invention.

A heat separation method of the present invention comprises a heat transfer restriction method and a heat dissipation method, which are used to separate the heat sources and reinforce heat dissipation loss, thereby maintaining a structural temperature gradient. The heat transfer restriction method of the present invention restricts heat transfer through section thickness areas of the structure, hereinafter referred to as heat transfer restriction areas 147, which are used to reduce the amount of heat being conducted through heat source areas to achieve the object of heat separation.

Referring to FIG. 1A, FIG. 1B, FIG. 2A, FIG. 2B, FIG. 2C, FIG. 2D, FIG. 3A, FIG. 3B, FIG. 3C, FIG. 4A, FIG. 4B, FIG. 4C, FIG. 4D, FIG. 4E, FIG. 5A, FIG. 5B, and FIG. 5C, which show a diaphragm valve made of resin, such as a non-metallic normally closed diaphragm valve 1a, which is assembled from a valve portion 10a and an actuation gas cylinder 10b, which provide a heat separation method. The valve portion 10a includes a valve body 2 and a diaphragm 3. The actuation gas cylinder 10b includes an upper valve body 5, a valve upper cover 6, a valve shaft 4, an actuation gas connection 171, and a coolant gas connection 161. The actuation gas connection 171 and the coolant gas connection 161 are both positioned above the heat transfer restriction areas 147. The valve upper cover 6 is gastight disposed on the valve body 2 to form a gas cylinder structure 8, the interior of which contains a valve shaft set structure 7 and springs. The gas cylinder structure 8 is provided with a gas chamber 175, and the valve shaft set structure 7 includes the diaphragm 3, the valve shaft 4, and the upper valve body 5. Because of the different structures of diaphragm valves, the gas chamber 175 is installed on the valve body 2 or the valve upper cover 6.

The valve body 2 includes an annular portion 24 and a square portion 25, wherein the square portion 25 includes an inlet pipe 21, an outlet pipe 22, and a valve box 23. The inlet pipe 21 is connected to a pipe connection 211, and the outlet pipe 22 is connected to a pipe connection 221, The valve box 23 includes a valve seat 231, a flow channel 232, and a flow channel side wall 233, wherein the valve seat 231 is centrally positioned, the periphery of which forms the circumferential symmetrical, indented flow channel 232, The annular portion 24 is provided with a sealing face 240, an opening portion 241, a minimum diameter area 242, an internal ring surface 243, a seal groove 245, an external ring surface 246, and a heat dissipation ribbed plate 248, and is provided with an actuation gas hole 172 and a coolant gas hole 162. The minimum diameter area 242 at one end of the annular portion 24 is connected to the square portion 25. The heat dissipation ribbed plate 248 is installed on the external ring surface 246 of the minimum diameter area 242 and connects to the square portion 25. The square portion 25, the minimum diameter area 242, the seal groove 245, and the heat dissipation ribbed plate 248 are all the heat transfer restriction areas 147.

The square portion 25 is provided with a square plate 251 and a plurality of ribbed plates, which includes a plurality of horizontal ribbed plates 253, longitudinal vertical ribbed plates 254, and a plurality of transverse vertical ribbed plates 255. An opening in the middle of the square plate 251 is used to contain the valve box 23, and connects with the flow channel side wall 233. The longitudinal vertical ribbed plates 254 and the transverse vertical ribbed plates 255 are installed below the square plate 251 and are used to connect to the inlet pipe 21, the outlet pipe 22, and the flow channel side wall 233. The square plate 251, the longitudinal vertical ribbed plates 254, and the transverse vertical ribbed plates 255 are all the heat transfer restriction areas 147.

The diaphragm 3 is fitted with a peripheral portion 31, an elastic strip 32, and a central portion 33. The center portion 33 is provided with a screw hole 331.

The valve shaft 4 is fitted with a locking portion 41, a hollow shaft rod 42, and a piston portion 43, wherein the locking portion 41 is used to tightly lock the central portion 33 of the diaphragm 3. The hollow shaft rod 42 passes through a shaft hole portion 53 of the upper valve body 5, and is sealed by a plurality of O-shaped rings. The hollow shaft rod 42 is provided with an axis hole 425 and a plurality of gas guide holes 426. The piston portion 43 is fitted with a disc portion 431, lower annular ribbed plates 432, and upper annular ribbed plates 433. The upper annular ribbed plates 433 is installed on the upper side of the disc portion 431, and the lower annular ribbed plates 432 is installed on the lower portion of the disc portion 431.

The upper valve body 5 is installed on the inner side of the annular portion 24; moreover, the upper valve body 5 is provided with an external ring surface 51, a tightening portion 52, the shaft hole portion 53, a first annular recess 54, a second annular recess 55, and a diaphragm chamber 56. The tightening portion 53 is fitted with a plurality of cooling gas guide holes 164 and actuation gas guide holes 174. The second annular recess 55 is fitted with a plurality of radial ribbed plates 551. The bottom portions of the first annular recess 54 and the second annular recess 55 are all the heat transfer restriction areas 147.

The valve upper cover 6 assumes an inverted cup shape that is assembled on the valve body 2, and is provided with an internal holding chamber 61, a top portion 62, an external ring portion 63, and a sealing face 64. The internal holding chamber 61 is provided with an internal ring surface 611, and the top portion 62 is provided with a center through hole 621 and a plurality of heat dissipation ribbed plates 625.

The pipe connection 211 is assembled on one side of the square portion 25. The inlet pipe 21 horizontally passes through one side of the square portion 25 and connects to the flow channel 232 of the valve seat 231. An opening of the valve seat 231 is used to butt connect with the central portion 33 of the diaphragm 3. The entrance of the outlet pipe 22 is configured at the flow channel side wall 233 of the valve box 23 and penetrates another side of the square portion 25 to connect with the pipe connection 221.

The extension direction of the inlet pipe 21 and the outlet pipe 22 defines a horizontal direction. The highest position of the flow channel 232 is above the inlet pipe 21 and the outlet pipe 22. The thickness of the flow channel side wall 233 is the same as that of the inlet pipe 21. The flow channel side wall 233 is one of the heat transfer restriction areas 147.

The peripheral portion 31 is fixed in the seal groove 245, and tightening by the tightening portion 52 enables completely sealing the valve box 23. The central portion 33 acts as a switch corresponding to the valve seat 231.

The gas cylinder structure 8 includes the valve upper cover 6, the upper valve body 5, and the annular portion 24. The gas chamber 175 is separated by the piston portion 43 of the valve shaft set structure 7 into an upper gas chamber 175a and a lower gas chamber 175b. The gas chamber 175 can be installed on the internal ring surface 243 of the annular portion 24, or can be installed on the internal ring surface 611 of the internal holding chamber 61 of the valve upper cover 6. The outer edge of the piston portion 43 is coupled to the gas chamber 175 to effect a reciprocating motion, and the tail end of the valve shaft 4 penetrates the center through hole 621 of the valve upper cover 6. The gas cylinder structure 8 is positioned above the heat transfer restriction areas 147.

The above-described plurality of horizontal ribbed plates 253, the longitudinal vertical ribbed plates 254, and a plurality of the transverse vertical ribbed plates 255 connect with the inlet pipe 21, the outlet pipe 22, and the flow channel side wall 233, which do not have the problem of accumulated thickness 9163 of the prior art.

The lower annular ribbed plates 432 is coupled to the second annular recess 55, the configuration between the two of which forms a sliding fit, and provides a damping effect to reduce vibration when the diaphragm is being displaced up and down.

The gas cylinder structure 8 is supported by the structure of the annular portion 24, ensuring rigid support of the shaft hole portion 53 as well as ensuring perpendicularity and concentricity of the valve shaft 4. The external ring surface 246 fitted with the heat dissipation ribbed plates 248 provides additional supporting force for the gas cylinder structure 8. Because the external ring surfaces 51 of the upper valve body 5 are all assembled on the inner side of the annular portion 24, thus, the piston portion 43 transmits actuation gas pressure and spring vibration of the gas chamber 175 to the valve body 2, that is, the structure of the valve body 2 is able to absorb and bear the tightening force, and will not produce structural creeping and come loose. Moreover, the gas cylinder structure 8 is positioned above the heat transfer restriction areas 147, and the upper valve body 5 provided with the heat transfer restriction areas 147 enables minimizing heat transmission of the heat source areas, which further enables maintaining the strength of the gas cylinder structure 8.

The annular portion 24 and the valve box 23 construct a cup-shaped structure 26, which assumes a deep cup shape. The cup-shaped structure 26 is provided with an outer edge height 261 (H), which is the height from the seal groove 245 to the sealing face 240. The outer edge height 261 (H) is at least 80% to 160% of the height of the upper valve body 5. The diaphragm 3 is assembled at a position close to the bottom portion of the cup-shaped structure 26, wherein this position is also provided with an internal cooling flow channel to effect cooling. Under conditions of high temperature distortion, the annular portion 24 assists in providing high structural strength and also ensures minimizing the possibility of leakage from the peripheral portion 31 of the diaphragm 3. Moreover, the valve shaft set structure 7 is assembled on the annular portion 24, that is, the cup-shaped structure 26 provides the valve shaft set structure 7 with the most stable support. Hence, concentricity and perpendicularity is ensured when the valve shaft 4 is performing an opening/closing movement, and maximum assistance to reducing particle release is provided.

A heat dissipation method for the heat separation method of the present invention comprises an external natural cooling 15 and an internal cooling 16, wherein the external natural cooling 15 uses the square portion 25 of the valve body 2, the heat dissipation ribbed plates 248 of the annular portion 24, and heat dissipation ribbed plates 633 of the valve upper cover 6 to carry out natural-convection cooling. The internal cooling 16 is achieved through an internal cooling flow channel, which includes one or more than one said coolant gas holes 162 of the valve body 2, a coolant gas ring groove 163, a plurality of the coolant gas guide holes 164 of the upper valve body 5, a diaphragm space 165 of the diaphragm chamber 56 of the upper valve body 5, a plurality of the gas guide holes 426 of the valve shaft 4, and the axis hole 425 of the hollow shaft rod 42. The internal cooling 16 is separated into internal natural cooling and internal forced cooling, wherein the internal natural cooling uses rising force of high temperature gas in the hollow shaft rod 42 to assist the external cooling gas to enter the internal cooling flow channel to achieve the objective of expelling quantities of heat. The internal forced cooling consists of externally forcing cooling gas through the internal cooling flow channel to achieve the objective of expelling quantities of heat. In addition, the square plate 251 and the horizontal ribbed plates 253, the longitudinal vertical ribbed plates 254, and the transverse vertical ribbed plates 255 are all provided with a heat transfer section thickness, which lies between 1 centimeter to not exceeding the thicknesses of the inlet pipe 21 and the outlet pipe 22, to the extent of being less than 3 mm. The heat dissipation ribbed plate 625 is provided with a heat transfer section thickness, which lies between 1 centimeter to not exceeding the thicknesses of the inlet pipe 21 and the outlet pipe 22, to the extent of being less than 3 mm. The annular portion 24 is provided with a heat transfer section thickness, and the heat transfer section thickness of the minimum diameter area 242 is less than the heat transfer section thickness at other positions of the annular portion 24, wherein the heat transfer section thickness of the minimum diameter area 242 lies between 1 centimeter to not exceeding the thicknesses of the inlet pipe 21 and the outlet pipe 22, to the extent of being less than 3 mm. Such a configuration enables providing heat dissipation effectiveness and sufficient structural strength.

The different forms of the diaphragm of the present invention include the non-metallic diaphragm valve 1a and a metallic diaphragm valve, wherein the non-metallic diaphragm valve 1a can be separated into a non-metal normally closed diaphragm valve and a non-metallic normally open diaphragm valve. The metallic diaphragm valve can be separated into a metallic normally closed diaphragm valve and a metallic normally open diaphragm valve. An electrostatic diaphragm valve can be derived from the first two types.

The external ring surface 246 of the annular portion 24 of the valve body 2 is differentiated into a non-metallic annular portion 24a configured with external threaded teeth 247 or a metallic annular portion 24b configured with a plurality of bolt sleeves 13. The bolt sleeves 13 are positioned above the heat transfer restriction areas 147.

The square portion 25 of the valve body 2 is differentiated into a first molded square portion 25a and a second molded square portion 25b.

The first molded square portion 25a is consisted of the square plate 251, a plurality of the longitudinal vertical ribbed plates 254, a plurality of the horizontal ribbed plates 253, and a plurality of the transverse vertical ribbed plates 255. The lower structure of the square plate 251 of the first molded square portion 25a is used to support the inlet pipe 21, the outlet pipe 22, and the flow channel 232, and further constructs a lattice-shaped ribbed plate with a plurality of horizontal openings. Moreover, the longitudinal vertical ribbed plates 254 lie below the square plate 251 and connect the upper sides and lower sides of the inlet pipe 21 and the outlet pipe 22. The horizontal ribbed plates 253 are on two sides as well as the lower portions of the inlet pipe 21, the outlet pipe 22, and the flow channel 232; whereas the transverse vertical ribbed plates 255 transversely cross over the inlet pipe 21, the outlet pipe 22, and the flow channel 232.

The second molded square portion 25b is consisted of the square plate 251 and two of the transverse vertical ribbed plates 255. The lower structure of the square plate 251 of the second molded square portion 25b is used to support the inlet pipe 21, the outlet pipe 22, and the flow channel 232, and further constructs a structure with horizontal openings. The longitudinal vertical ribbed plates 254 lies below the square plate 251 and connects the upper side of the inlet pipe 21 and the upper side of the outlet pipe 22. The transverse vertical ribbed plate 255 transversely crosses over the lower sides of the inlet pipe 21 and the outlet pipe 22. That is, the square portion 25 includes a first side surface, a second side surface, and a bottom surface, and the longitudinal vertical ribbed plates 254, the horizontal ribbed plate 253, and the transverse vertical ribbed plate 255 form the lattice-shaped ribbed plates on any one of, any two of, or all of the first side surface, the second side surface, and the bottom surface.

The valve body 2 is formed by ejection or extrusion molding using PFA (PolyFluoroAlkoxy), in which the lattice-shaped ribbed plates with horizontal openings are formed from horizontal sliding of two slide blocks. Therefore, the external surfaces of the inlet pipe 21 and the outlet pipe 22 from the space between a horizontal center line to the square plate 251 will not accumulate the PFA material as the accumulated thickness 9163 of the prior art does. Moreover, the four corners at the lowest side of the square portion 25 can still use four screw caps and bolts to fix the valve body 2 on the mounting plate 10a 1.

The valve shaft 4 can also be differentiated into a rotatable valve shaft and a fixed valve shaft.

The locking portion 41 of the rotatable valve shaft is provided with a bolt hole 411, which is used to fix a bolt 416 therein. After the bolt 416 penetrates the bolt hole 411, a screw cap 414 is screwed thereon and then tightened in the screw hole 331 of the diaphragm 3. The screw cap 414 reversely tightens the diaphragm 3; moreover, the external diameter of the bolt 416 is smaller than the diameter of the bolt hole 411 so as to retain a radial clearance.

The locking portion 41 of the fixed valve shaft is provided with a threaded teeth portion 413, which is used to screw tight into the screw hole 331 of the diaphragm 3.

The rotatable valve shaft can be further differentiated into a normally closed valve shaft 4ac and a normally open valve shaft 4ad, wherein the lower side of the piston portion 43 of the normally closed valve shaft 4ac is provided with an additional shock absorption ring 434, which is coupled to the first annular recess 54. The upper side of the piston portion 43 of the normally closed valve shaft 4ac is installed with springs, which ensure that the diaphragm valve 1 is in a normally closed state, and the configuration between the two forms a sliding fit that provides a damping effect to reduce vibration during up and down displacement of the diaphragm 3. The lower side of the piston portion 43 of the normally open valve shaft 4ad bears the force of the springs installed inside the first annular recess 54 to ensure that the diaphragm valve is in a normally open state.

The fixed valve shaft 4b can be differentiated into a normally closed valve shaft 4bc and a normally open valve shaft 4bd, wherein the lower side of the piston portion 43 of the normally closed valve shaft 4bc is provided with the additional shock absorption ring 434, which is coupled to the first annular recess 54. The upper side of the piston portion 43 of the normally closed valve shaft 4bc is installed with springs, which ensure that the diaphragm valve 1 is in a normally closed state, the configuration between the two of which forms a sliding fit that provides a damping effect to reduce vibration during up and down displacement of the diaphragm 3. The lower side of the piston portion 43 of the normally open valve shaft 4bd bears the force of the springs installed inside the first annular recess 54 to ensure that the diaphragm valve is in a normally open state.

The upper valve body 5 can be differentiated into an external threaded teeth upper valve body 5a and a protruding edge upper valve body 5b. The external ring surface 51 of the external threaded teeth upper valve body 5a is configured with the external threaded teeth 511, whereas the external ring surface 51 of the protruding edge upper valve body 5b is configured with a radial protruding edge 512.

The valve upper cover 6 can be differentiated into a non-metallic valve upper cover 6a and a metallic valve upper cover 6b. The non-metallic valve upper cover 6a is configured with internal threaded teeth 632, whereas the metallic valve upper cover 6b is configured with no internal threaded teeth 632 but the external ring portion 63 thereof is provided with a plurality of the bolt sleeves 13.

The valve shaft set structure 7 includes the diaphragm 3, the upper valve body 5, and the valve shaft 4, and can be differentiated into an external threaded teeth valve shaft set 71 and a protruding ring valve shaft set 72. The external threaded teeth valve shaft set 71 uses the rotatable valve shaft and the external threaded teeth upper valve body 5a, whereas the protruding ring valve shaft set 72 uses the fixed valve shaft and the protruding edge upper valve body 5b. Moreover, an electrostatic valve shaft set 73 can be formed by inserting a conductive fibre 44 into the above-described valve shaft set structure 7, with the conductive fibre 44 passing through the axis hole 425 and then through the locking portion 41, finally being fitted to the non-liquid contact side surface of the diaphragm 3 in an annular curved line fashion. Using the rotatable valve shaft, the conductive fibre 44 is able to pass through the radial clearance of the bolt hole 411, whereas using the fixed valve shaft, the conductive fibre 44 is able to pass through the gas guide hole 426.

The gas chamber 175 of the gas cylinder structure 8 is named as an annular gas chamber 176 while being installed on the annular portion 24b, and is named as a valve upper cover gas chamber 177 while being installed on the valve upper cover 6b. The annular gas chamber 176 must use a rotatable valve shaft set, whereas the valve upper cover gas chamber 177, because of its structure, a rotatable valve shaft set or a fixed valve shaft set is chosen.

The gas cylinder structure 8 is differentiated into a non-metallic gas cylinder structure 8a and a metallic gas cylinder structure 8b. The non-metallic gas cylinder structure 8a is lock tightened by using threaded teeth between the non-metallic annular portion 24a and the non-metallic valve upper cover 6a, which is also the origin of the non-metallic diaphragm valve. Each of the four corners of the metallic gas cylinder structure 8b is tightened and sealed by a metal bolt, which tighten and seal the metallic annular portion 24b and the metallic valve upper cover 6b. Each of the bolts is protected by the bolt sleeve 13 that includes an upper bolt sleeve 131 and a lower bolt sleeve 132, which is also the origin of the metallic diaphragm valve.

Referring to FIG. 1A, FIG. 2A, FIG. 2B, FIG. 2C, FIG. 2D, FIG. 3A, FIG. 3C, FIG. 4A, FIG. 5A, which show the first embodiment of the present invention, wherein the non-metallic normally closed diaphragm valve 1a made from fluororesin comprises the valve body 2, an external threaded teeth normally closed valve shaft set 71a, and the non-metallic valve upper cover 6a, which are able to provide a practical heat separation method. The valve body 2 includes the inlet pipe 21, the outlet pipe 22, the valve box 23, the non-metallic annular portion 24a, and the first molded square portion 25a, wherein the non-metallic annular portion 24a is provided with the annular gas chamber 176. The external threaded teeth normally closed valve shaft set 71a uses the normally closed valve shaft 4ac. The annular portion 24a, the external threaded teeth normally closed valve shaft set 71a, and the non-metallic upper cover 6a construct the non-metallic gas cylinder structure 8a, which is lock tightened using threaded teeth of the annular portion 24a and the non-metallic upper cover 6a.

The ribbed plates of the lattice of horizontal openings of the first molded square portion 25a are produced using an injection or extrusion molded of PFA, with the lattice ribbed plates with horizontal openings being formed by horizontal sliding of two slide blocks. The lowest layered vertical open-ended lattice ribbed plate is formed by vertical sliding of slide blocks, therefore, the external surfaces of the inlet pipe 21 and the outlet pipe 22 from the space between a horizontal center line to the square plate 251 will not accumulate the PFA material as the accumulated thickness 9163 of the prior art does.

The non-metallic annular portion 24a is provided with the minimum diameter area 242 at one end connecting to the first square portion 25a, and the external ring surface 246 thereof is fitted with the heat dissipation ribbed plates 248. The seal groove 245 is configured at the minimum diameter area 242. The internal side wall of the seal groove 245 is the flow channel side wall 233 while the external side wall is the internal ring surface 243, and the bottom of the seal groove 245 is the square plate 251, which are used to contain the peripheral portion 31 of the diaphragm 3 and bear the tightening pressure of the upper valve body 5 to achieve sealing effectiveness. When the inlet pipe 21 and the outlet pipe 22 are full with high temperature, high pressure liquid causing distortion thereof, separation by the longitudinal vertical ribbed plates 254 ensures that the square plate 251 can substantially minimize distortion. Moreover, the heat dissipation ribbed plate 248 and the structure of the minimum diameter area 242, as well as the cup-shaped structure 26 and the outer edge height 261 (H) enable maintaining the roundness of the seal groove 245.

The external threaded teeth 247 are configured on the external ring surface of the opening portion 241, and are used to screw tighten the non-metallic valve upper cover 6a. The internal ring surface 243 is also configured with internal threaded teeth 244 and used to screw tighten the external threaded teeth upper valve body 5a. The external threaded teeth 247 overlap the internal threaded teeth 244 by a specific length, which is at least over and above two tooth spaces of the internal threaded teeth 244, thereby enabling providing a structure of high strength.

The coolant gas connection 161 and the actuation gas connection 171 are fitted to the upper side of the minimum diameter area 242, with a separation space positioned on the upper side of the square plate 251, that is, positioned on the upper side of the heat transfer restriction areas 147. The coolant gas connection 161 is connected to the coolant gas ring groove 163 on the upper side of the seal groove 245 through the coolant gas hole 162, and serves to cool the peripheral portion 31 of the diaphragm 3 to satisfy the needs of high temperature application thereof.

The external threaded teeth upper valve body 5a is provided with a plurality of the cooling gas guide holes 164 that connect to the coolant gas ring groove 163, which are able to ensure non-liquid contact with the peripheral portion 31 with the diaphragm 3 to achieve adequate cooling. The external ring surface 51 of the external threaded teeth upper valve body 5a is configured with the external threaded teeth 511, which are used to screw tighten on the internal threaded teeth 244 of the internal ring surface 243 of the annular portion 24. The external threaded teeth upper valve body 5a are not subjected to the force applied by the piston portion 43 and pressure from actuation gas causing distortion, thereby ensuring concentricity and perpendicularity of the valve shaft 4, and ensuring the tightening force of the peripheral portion 31 of the diaphragm 3, thus minimizing leakage and extending serviceable life thereof.

The top portion 62 of the non-metallic valve upper cover 6a is provided with the center through hole 621 that holds the tail end of the valve shaft 4 and protrudes therefrom. When the diaphragm 3 rises and opens, the tail end of the valve shaft 4 also rises, enabling operating personnel to visually understand the operating state. The top portion 62 is fitted with the heat dissipation ribbed plate 625, and the external ring portion 63 is fitted with the heat dissipation ribbed plate 633.

Figure 2A:
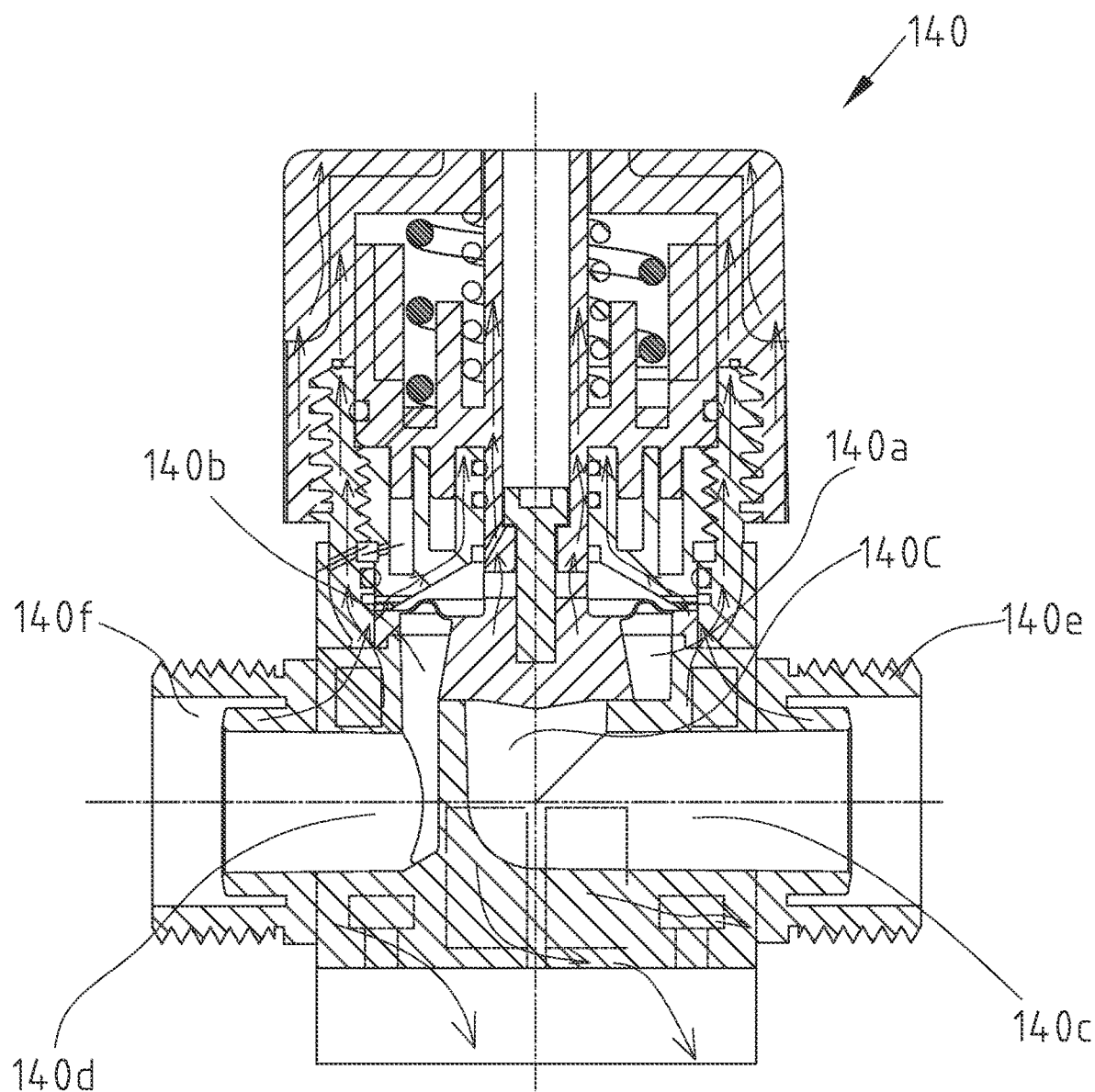
FIG. 2A is a schematic view of valve body heat source areas of the present invention.
Figure 2C:
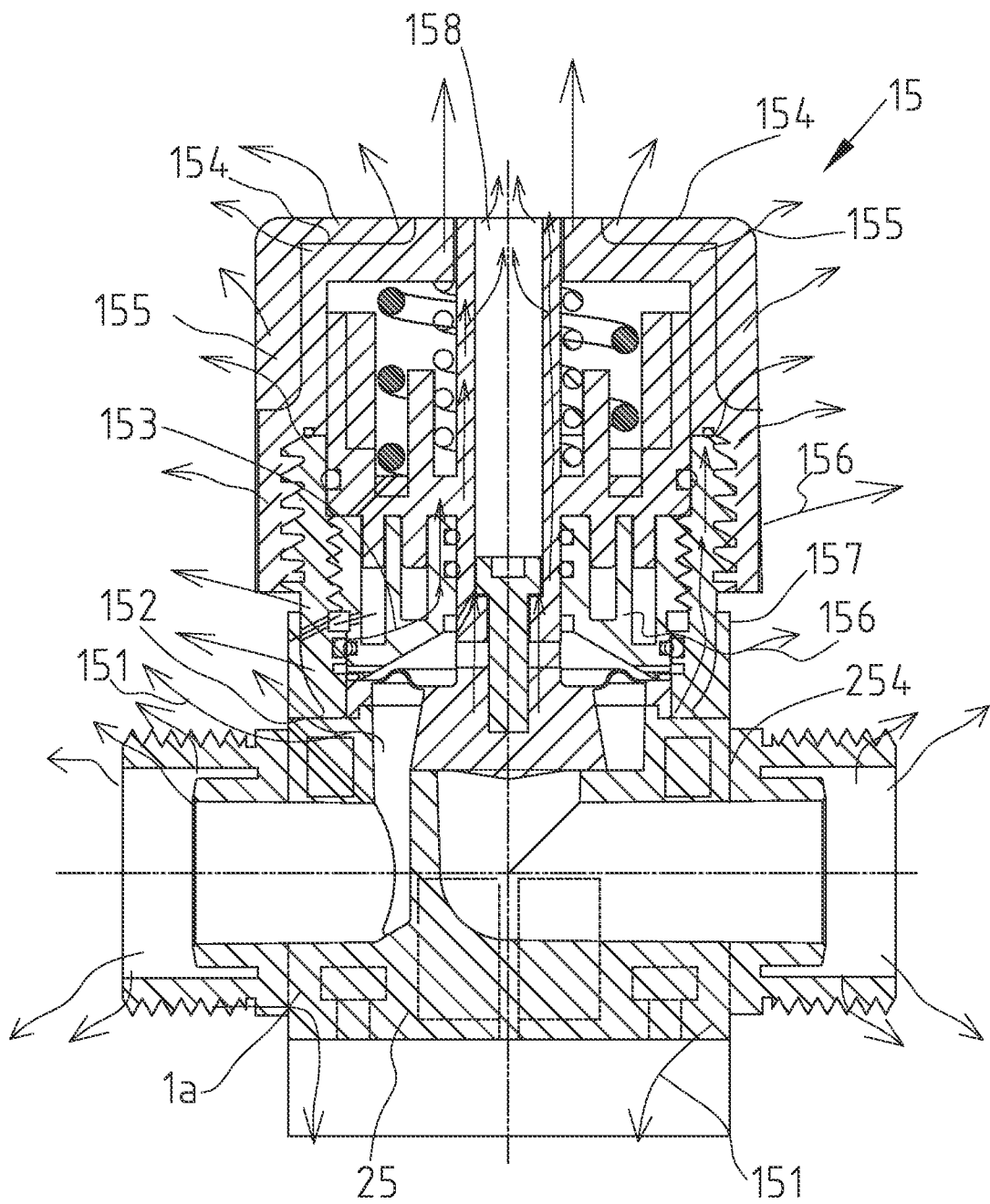
FIG. 2C is a schematic view of natural heat dissipation paths of the diaphragm valve of the present invention.
Figure 2D:
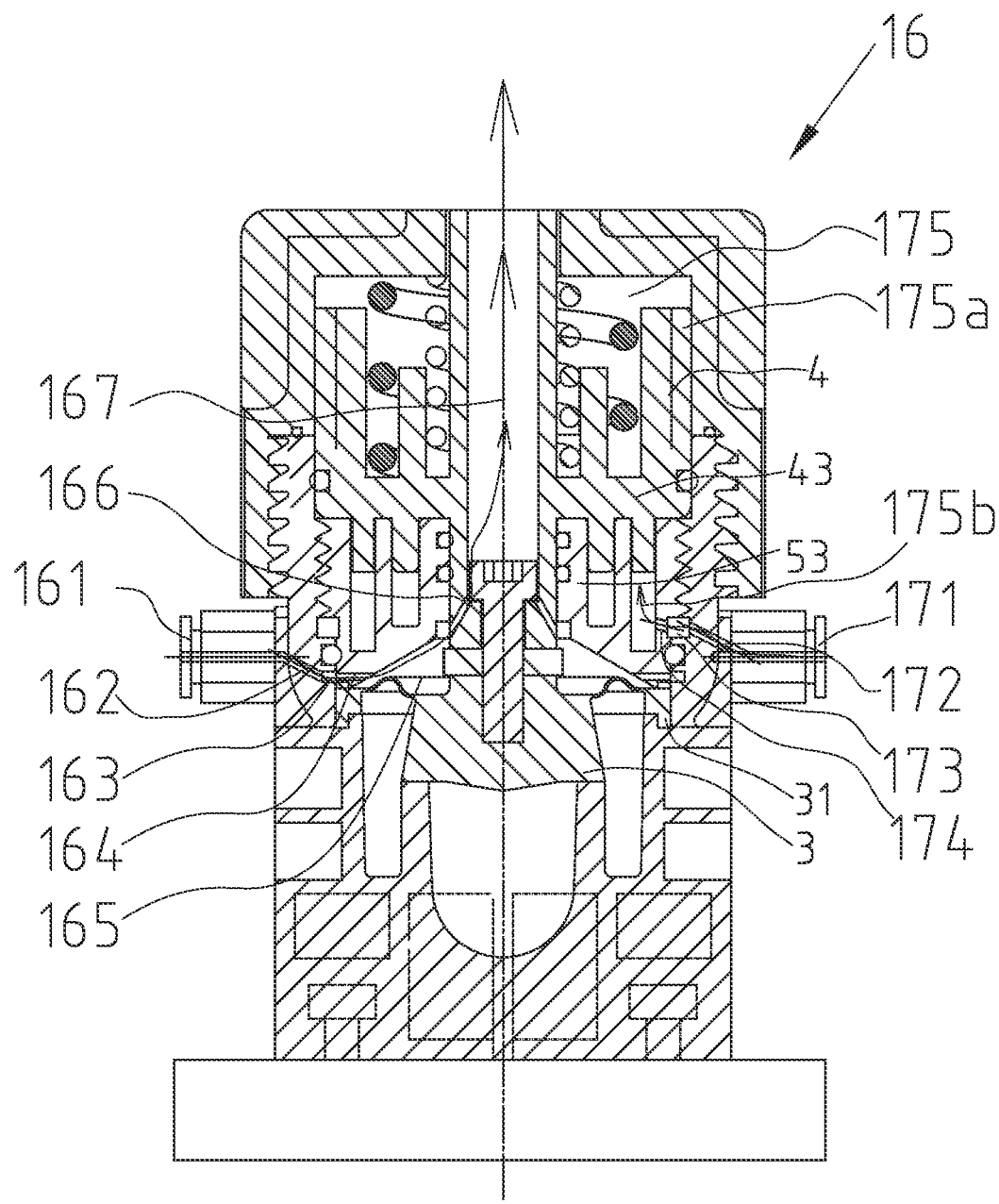
FIG. 2D is a schematic view of internal cooling of the diaphragm valve of the present invention.
Figure 3A:
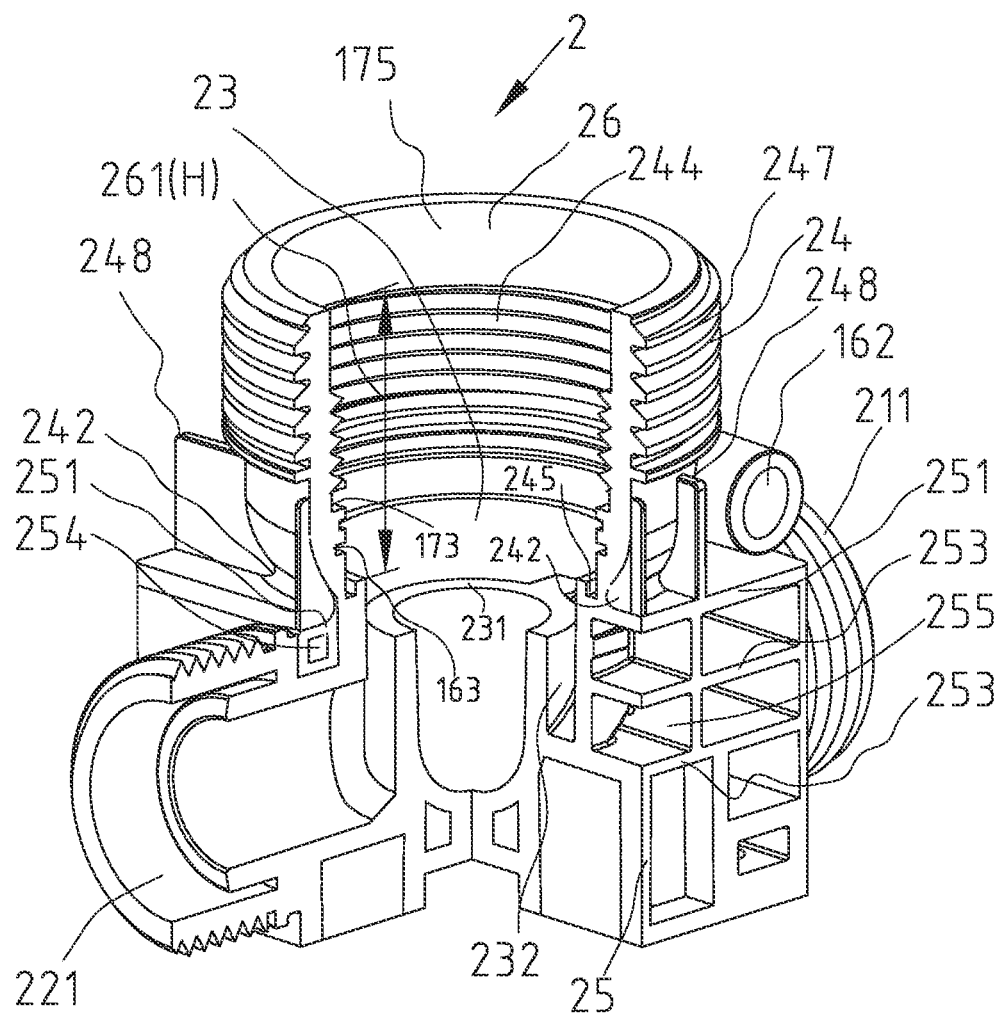
FIG. 3A is a three-dimensional cross-sectional view of a valve body of the present invention.
Figure 3B:
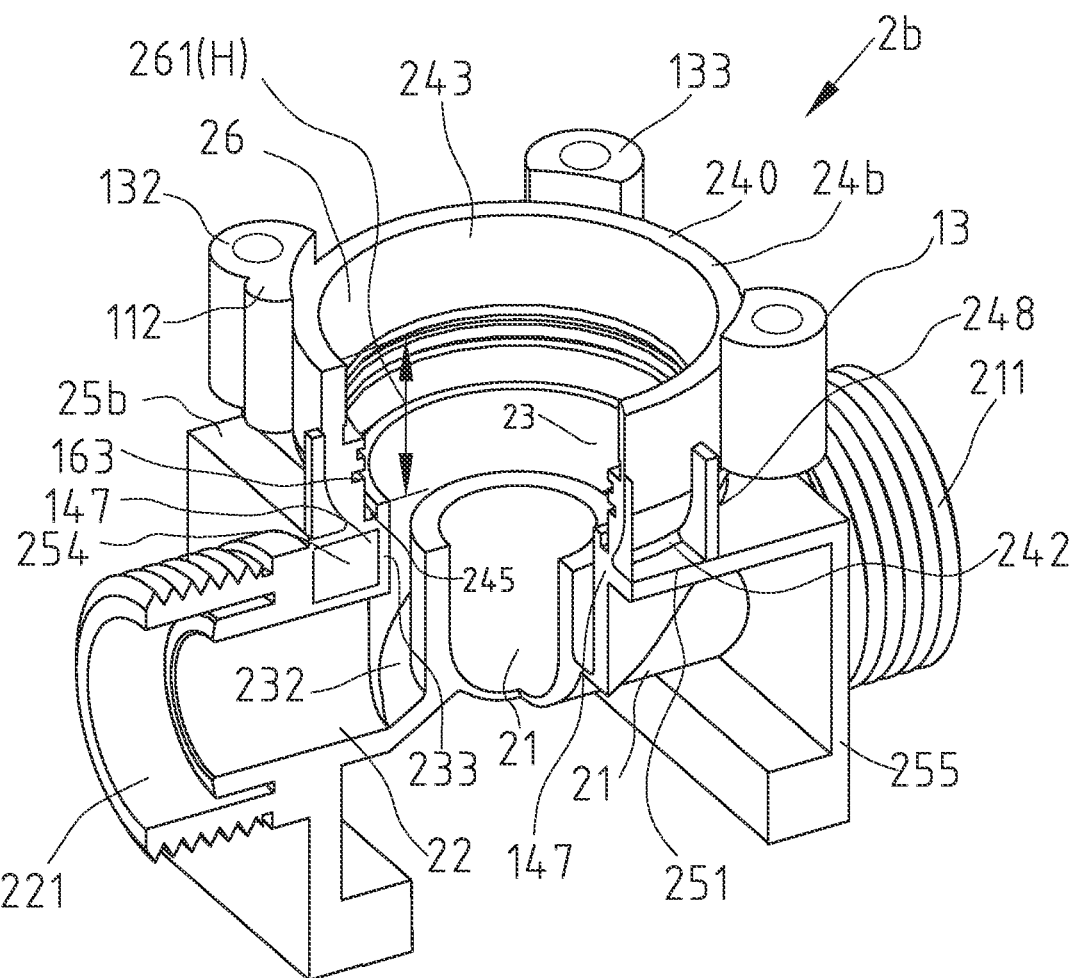
FIG. 3B is horizontal cross-sectional view of an inlet pipe positioned on the valve body according to the present invention.

Referring to FIG. 2D, FIG. 3A, and FIG. 3B, the non-metallic normally closed diaphragm valve 2 is provided with the inlet pipe 21, the outlet pipe 22, the valve box 23, the non-metallic annular portion 24a, and the first molded square portion 25a. The inlet pipe 21 is connected to the pipe connection 211, and the outlet pipe 22 is connected to the pipe connection 221. The valve box 23 includes the valve seat 231, the flow channel 232, and the flow channel side wall 233. The valve seat 231 is centrally positioned, the periphery of which forms the circumferential symmetrical, indented flow channel 232. The non-metallic annular portion 24a is provided with the sealing face 240, the opening portion 241, the minimum diameter portion 242, the internal ring surface 243, the seal groove 245, an actuation gas ring groove 173, the coolant gas ring groove 163, the external ring surface 246, the heat dissipation ribbed plate 248, the external threaded teeth 247, and the internal threaded teeth 244, as well as being provided with the coolant gas hole 162, the coolant gas connection 161, the actuation gas hole 172, and the actuation gas connection 171. One end of the metallic annular portion 24b is provided with the minimum diameter area 242 connected to the second molded square portion 25b, and is positioned on the outer side of the flow channel 232. The heat dissipation ribbed plate 248 is fitted on the external ring surface 246 of the minimum diameter area 242 and connected to the second molded square portion 25b. The minimum diameter area 242 and the seal groove 245 are both the heat transfer restriction areas 147. The first molded square portion 25a is provided with the square plate 251, a plurality of the longitudinal vertical ribbed plates 254, a plurality of the transverse vertical ribbed plates 255, and a plurality of the horizontal ribbed plates 253. The opening in the middle of the square plate 251 is used to contain the valve box 23, and connects to the flow channel side wall 233. The structure on the lower side of the square plate 251 is used to support the inlet pipe 21, the outlet pipe 22, and the flow channel 232, and further constructs a lattice-shaped ribbed plate with a plurality of horizontal openings. The lattice-shaped ribbed plate is one of the heat transfer restriction areas 147. Moreover, the longitudinal vertical ribbed plates 254 are positioned at the lower side of the square plate 251 and connect with the upper sides and lower sides of the inlet pipe 21 and the outlet pipe 22. The horizontal ribbed plates 253 are positioned at two sides and the lower side of the inlet pipe 21, the outlet pipe 22, and the flow channel 232. The transverse vertical ribbed plates 255 transversely cross over the inlet pipe 21, the outlet pipe 22, and the flow channel 232. The valve box 23 of the valve body 2 and the non-metallic annular portion 24a construct the cup-shaped structure 26. The cup-shaped structure 26 is provided with the outer edge height 261 (H), which is the height from the seal groove 245 to the sealing face 240; and the outer edge height 261 (H) is at least 80% to 160% of the height of the upper valve body 5.

Figure 3C:
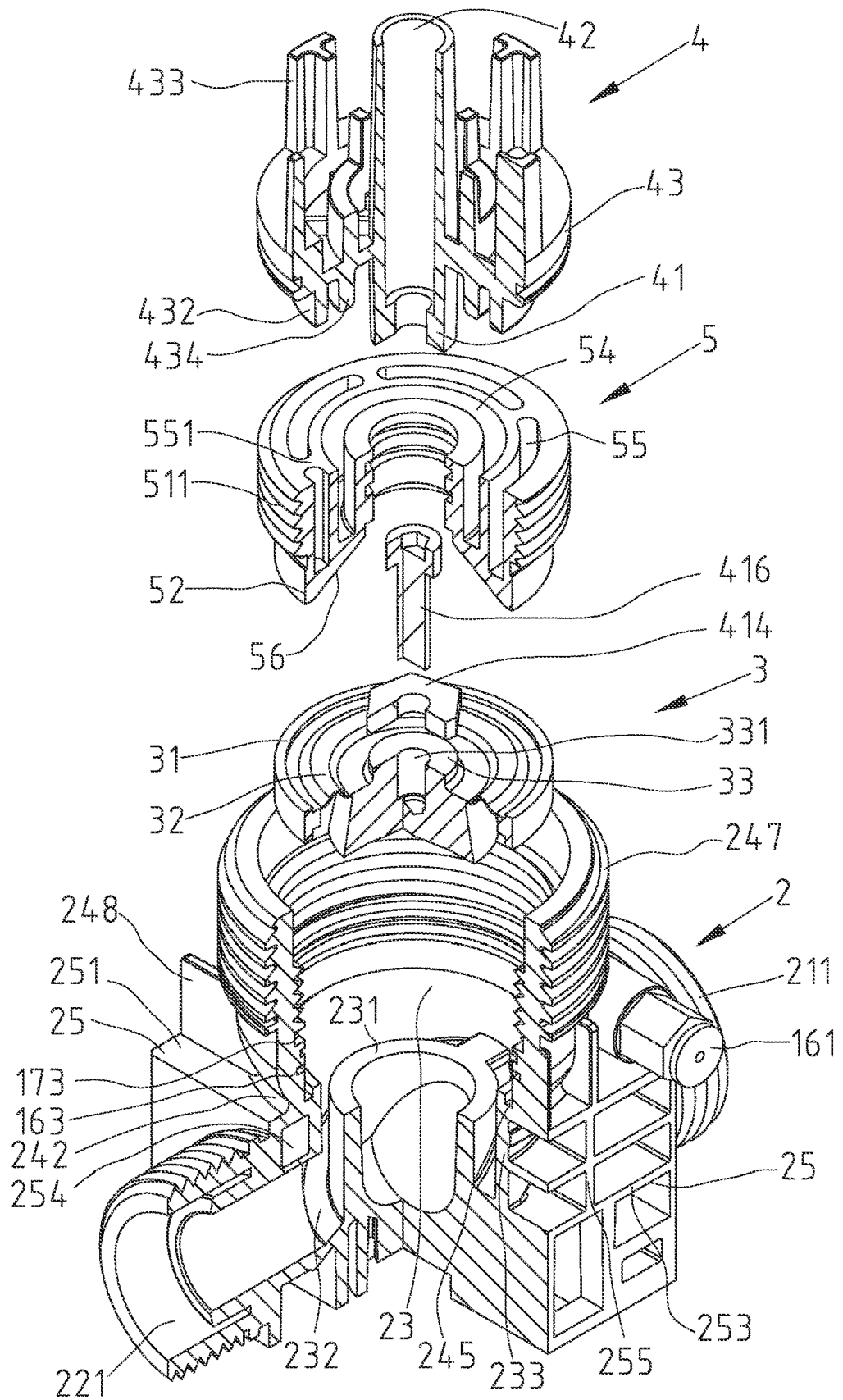
FIG. 3C is an exploded three-dimensional cross-sectional view of a second valve body of the present invention.
Figure 5A:
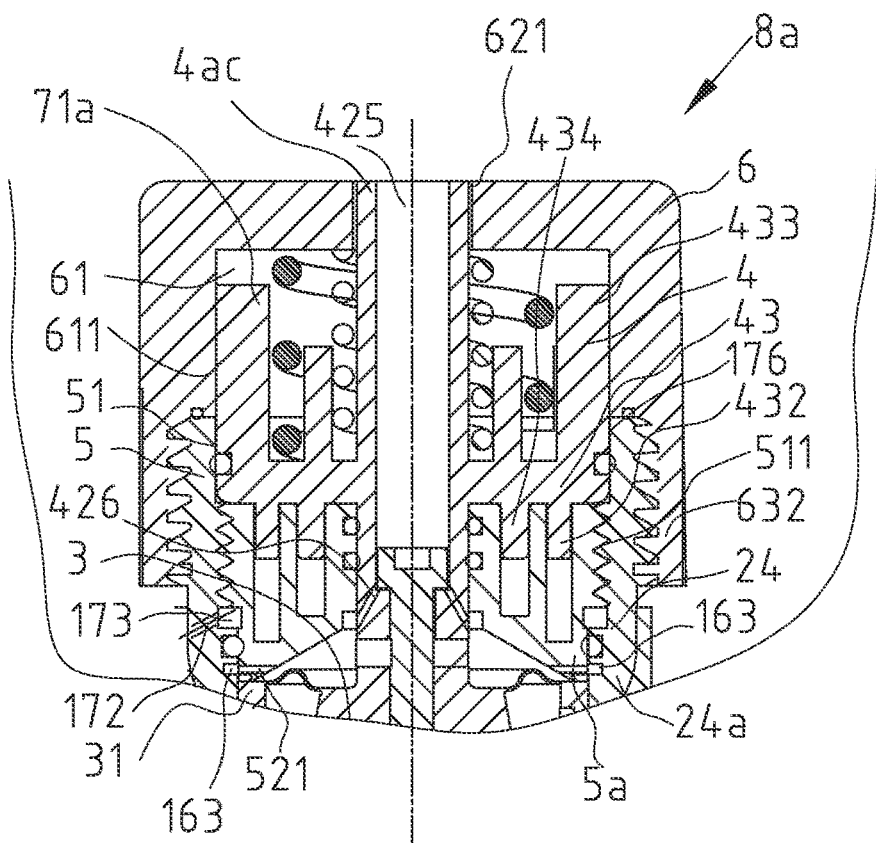
FIG. 5A is a partial cross-sectional view of a gas cylinder structure positioned on an annular portion gas chamber using the external threaded tooth bearing set according to the present invention.

Referring to FIG. 2D, FIG. 3C, and FIG. 5A, wherein FIG. 3C shows an exploded view of the non-metallic normally closed diaphragm valve 2, the non-metallic normally closed diaphragm valve 2 uses the rotatable valve shaft and the external threaded teeth upper valve body 5a. The gas chamber 175 installed on the inner side of the non-metallic annular portion 24a is the annular gas chamber 176. The external threaded teeth normally closed valve shaft set 71a is assembled from the diaphragm 3, the external threaded teeth upper valve body 5a, and the normally closed valve shaft 4ac. The normally closed valve shaft 4ac includes the locking portion 41, the hollow shaft rod 42, and the piston portion 43. The locking portion 41 includes the bolt hole 411, the screw cap 414, and the bolt 416. The hollow shaft rod 42 includes the axis hole 425 and the gas guide hole 426. The piston portion 43 includes the disc portion 431, the lower annular ribbed plates 432, the upper annular ribbed plates 433, and the damping ring 434. The external threaded teeth upper valve body 5a includes the external ring surface 51, the tightening portion 52, the shaft hole portion 53, the first annular recess 54, the second annular recess 55, and the diaphragm chamber 56. The external ring surface 51 is configured with the external threaded teeth 511, and the tightening portion 52 is fitted with the coolant gas guide hole 164 and the actuation gas guide hole 174. The second annular recess 55 is fitted with a plurality of the radial ribbed plates 551.

Referring to FIG. 4A and FIG. 5A, which show the external threaded teeth normally closed valve shaft set 71a applied in a non-metallic normally closed diaphragm valve using the normally closed valve shaft 4ac and the external threaded teeth upper valve body 5a. The gas chamber 175 installed on the inner side of the non-metallic annular portion 24a is the annular gas chamber 176. The external threaded teeth normally closed valve shaft set 71a is assembled from the diaphragm 3, the external threaded teeth upper valve body 5a, and the normally closed valve shaft 4ac.

Figure 4B:
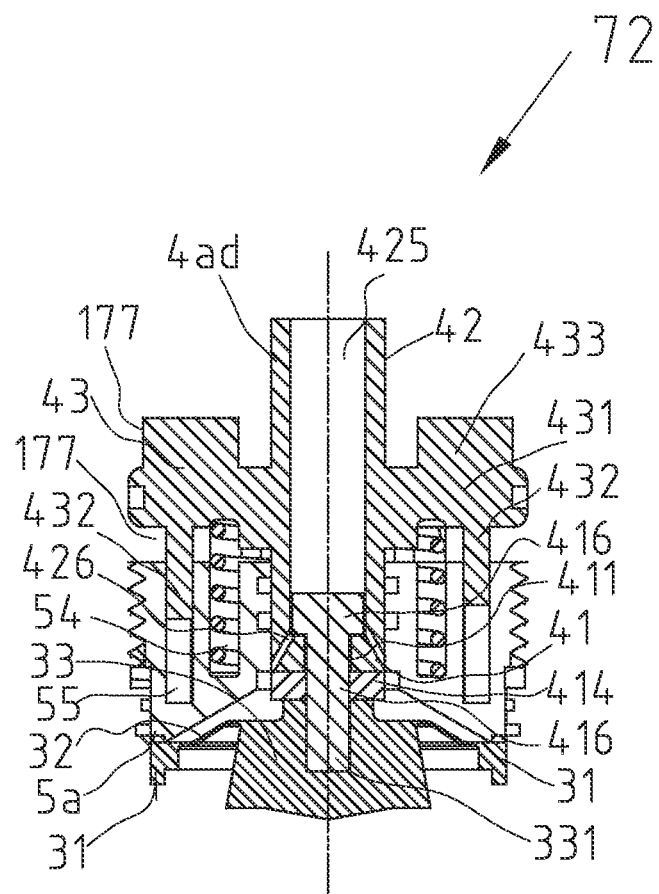
FIG. 4B is a cross-sectional view of a normally open external threaded tooth bearing set of the present invention.
Figure 4C:
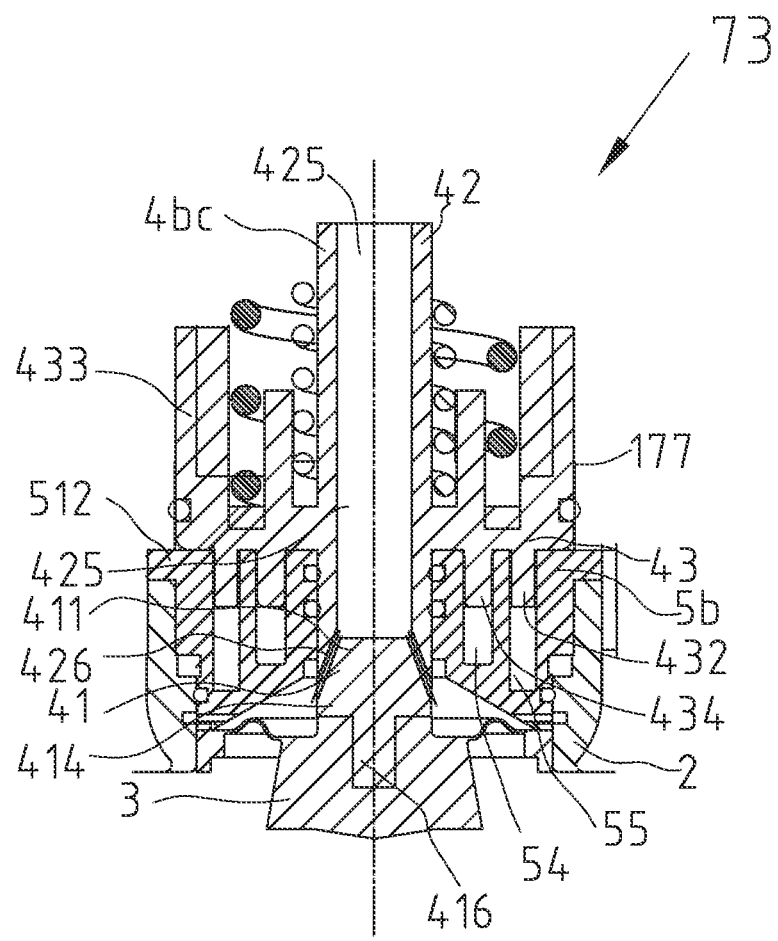
FIG. 4C is a cross-sectional view of a normally closed protruding edge valve shaft set of the present invention.
Figure 5B:
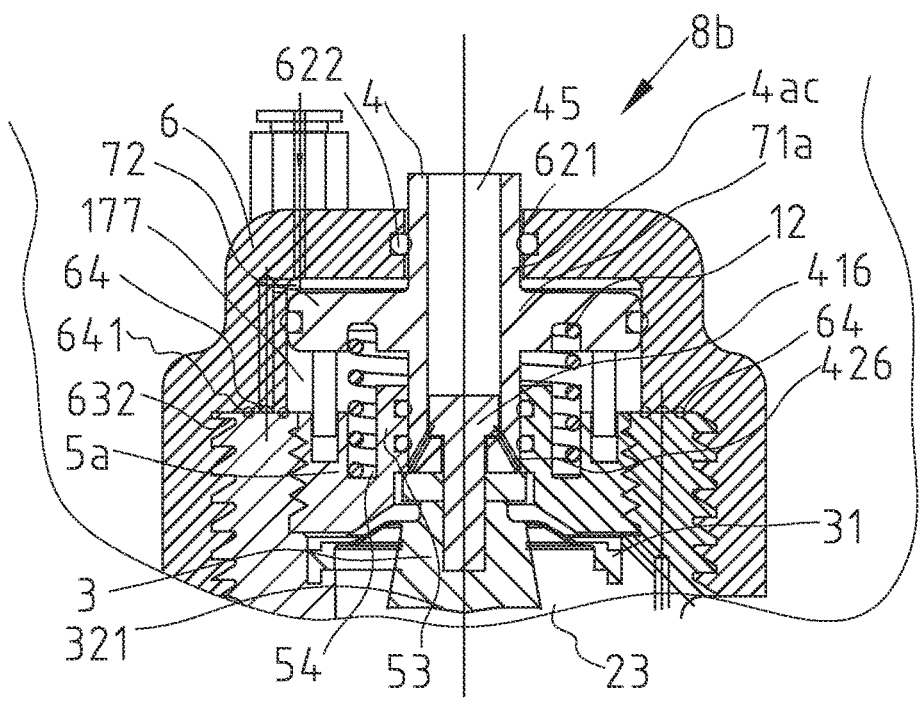
FIG. 5B is a partial cross-sectional view of a gas cylinder structure positioned on a valve upper cover gas chamber using the external threaded tooth bearing set according to the present invention.

Referring to FIG. 4B and FIG. 5B, which show an external threaded teeth normally open valve shaft set 71b applied in a metallic normally open diaphragm valve using a rotatable valve shaft and the external threaded teeth upper valve body 5a. The dissimilarity with FIG. 4A lies in that the gas chamber 175 is installed on the metallic valve upper cover 6b and forms the valve upper cover gas chamber 177. The external threaded teeth valve shaft set 71 is assembled from the diaphragm 3, the external threaded teeth upper valve body 5a, and the normally open valve shaft 4ad.

Referring to FIG. 5A, which shows the gas cylinder structure 8a of the annular gas chamber 176, and uses the external threaded teeth normally closed valve shaft set 71a applied in a non-metallic normally closed diaphragm valve using the normally closed valve shaft 4ac and the external threaded teeth upper valve body 5a. The gas chamber 175 is installed on the inner side of the non-metallic annular portion 24a and forms the annular gas chamber 176.

Referring to FIG. 5B, which shows the metallic gas cylinder structure 8b, and uses the external threaded teeth normally closed valve shaft set 71a applied in a metallic normally closed diaphragm valve using the normally closed valve shaft 4ac and the external threaded teeth upper valve body 5a. The dissimilarities with FIG. 5A lie in that the gas chamber 175 is installed on the inner side of the metallic valve upper cover 6b and forms the valve upper cover gas chamber 177. The external threaded teeth valve shaft set 71 is assembled from the diaphragm 3, the external threaded teeth upper valve body 5a, and the normally closed valve shaft 4ac.

Referring to FIG. 1B, FIG. 2A, FIG. 2B, FIG. 2C, FIG. 2D, FIG. 3B, FIG. 4D, and FIG. 5C, which show a second embodiment of the present invention, wherein a metallic normally open diaphragm valve made from fluororesin comprises the valve body 2, the protruding ring valve shaft set 72, and the metallic valve upper cover 6b. The valve body 2 includes the inlet pipe 21, the outlet pipe 22, the valve box 23, the metallic annular portion 24b, and the second molded square portion 25b; and is provided with internal cooling. The internal ring surface 243 of the metallic annular portion 24b is used to assemble the protruding ring valve shaft set 72 thereon. The interior of the metallic valve upper cover 6b is installed with the gas chamber 175. The protruding ring valve shaft set 72 uses the normally open valve shaft 4bd, the annular portion 24b, the protruding ring valve shaft set 72, and the metallic valve upper cover 6b to construct the metallic gas cylinder structure 8b. The metallic gas cylinder structure 8b is tightly fastened by the metallic annular portion 24b and the metallic valve upper cover 6b using metallic bolts; moreover, the protruding ring valve shaft set 72 is clamped and sealed on the radial protruding edge 512 by the metallic annular portion 24b and the metallic valve upper cover 6b.

The metallic valve upper cover 6b assumes a cup shape and is assembled on the metallic annular portion 24b. The metallic valve upper cover 6b and the protruding ring valve shaft set 72 together with the metallic annular portion 24b construct the gas cylinder structure 8b, which is provided with the valve upper cover gas chamber 177 that is positioned above the heat transfer restriction areas 147.

The four corner portions of the metallic valve upper cover 6b and the metallic annular portion 24b respectively hold the bolt sleeves 13, which are fitted above the minimum diameter area of the annular portion 24 and positioned so as to have a space separating them from the square plate 251, that is, positioned above the heat transfer restriction areas 147, thereby preventing the thick and solid structure of the bolt sleeves 13 from becoming a large heat transfer area, resulting in failure of heat source separation. The interior of each of the lower bolt sleeves 132 on the metallic annular portion 24b is provided with a metallic internal threaded teeth socket, which metal bolts can use to tightly fasten and seal the sealing face 240. An upper sealing face 133 is provided between the upper bolt sleeves 131 and the lower bolt sleeves 132 to prevent the metal bolts from corrosion.

The metallic valve upper cover 6b and the metallic annular portion 24b are respectively fitted with a gas column 11 at the side of the inlet pipe 21 or the side of the outlet pipe 22, and next to the bolt sleeves 13. The coolant gas connection 161 and the actuation gas connection 171 are respectively installed on the metallic valve upper cover 6b, wherein the actuation gas connection 171 communicates directly with the gas chamber 175. The coolant gas hole 162 and the actuation gas hole 172 are provided on the valve upper cover 6 and the annular portion 24, respectively. Two gas columns 169 on a sealing face 113 are also each installed with an O-shaped ring to seal and ensure gas tightness. Moreover, the gas columns 169 are installed above the minimum diameter area of the annular portion 24 and positioned so as to have a space separating them from the square plate 251, that is, positioned above the heat transfer restriction areas 147, thereby preventing the thick and solid structure of the gas columns 169 from becoming large heat transfer areas, resulting in failure of heat source separation.

Actuation gas is actuated by passing through the actuation gas connection 171 to the upper side of the piston 43. The outer edge of the piston 43 is coupled to the gas chamber 175 to effect a reciprocating motion.

The internal cooling 16 uses internal forced cooling 16b, wherein the coolant gas passes through the coolant gas connection 161, then through the coolant gas hole 162 and enters the coolant gas ring groove 163; thereon the coolant gas passes through a plurality of the coolant gas guide holes 164 and enters the non-liquid contact side of the diaphragm 3 of the diaphragm space 165, finally passing through the gas guide holes 426 to enter an axis hole 167, and expelled from a gas recovery connection 168. The internal forced cooling 16b carries out better cooling of the peripheral portion 31 of the diaphragm 3, and thus is able to maintain the tightening force of the tightening portion 52. Moreover, the heat will not easily dissipate outward from the fluororesin O-rings on the valve shaft 4 and the piston portion 43 but is able to dissipate through a hollow axis channel 158, ensuring both concentricity and perpendicularity of the valve shaft 4.

The tightening and sealing effectiveness of the present invention ensures high structural strength, resistance to surrounding corrosive gas, and endurance to the reciprocating motion of a piston.

Regarding the structural strength, the gas cylinder structure, the four bolt sleeves 13 and the gas columns 11 are all positioned above the minimum diameter area 242 of the annular portion 24, and also positioned above the square plate 51, as well as being positioned above the heat transfer restriction areas 147. Actuation gas pressure from piston movement and vibrations from the springs 12 are all transferred to the valve body 2, the structure of which is able to absorb and endure.

Regarding resistance to surrounding corrosive gas, the cup-shaped structure 26 and the upper edge height 261 (H) enable distancing the metallic bolts from the position of the diaphragm 3, thereby reducing micro amounts of gas from penetrating the diaphragm 3 or corrosion from liquid entering, thus removing contamination problems from metallic oxide diffusion, and eliminating the need for operators and inspectors to inspect whether or not the bolts are corroded and need replacing.

Regarding endurance to the reciprocating motion of a piston, the cup-shaped structure 26 and the upper edge height 261 (H) ensure firm support of the protruding edge upper valve body 5b. The protruding edge upper valve body 5b is not subjected to the force applied by the piston portion 43 and the pressure of the actuation gas, but provides a tightening force with high dependability to seal and minimize structural distortion and creeping. Further, the protruding edge upper valve body 5b will not reduce the tightening force and cause leakage from the diaphragm 3, thus ensuring concentricity and perpendicularity of the valve shaft 4b, as well as ensuring the tightening force of the peripheral portion 31 of the diaphragm 3, thereby minimizing leakage and extending the serviceable life thereof.

Referring to FIG. 3B, which shows the valve body 2 applied in a metallic normally open diaphragm valve 1d, wherein the valve body 2 is provided with the inlet pipe 21, the outlet pipe 22, the valve box 23, the metallic annular portion 24b, and the second molded square portion 25b. The inlet pipe 21 is connected to the pipe connection 211, and the outlet pipe 22 is connected to the pipe connection 221. The valve box 23 includes the valve seat 231, the flow channel 232, and the flow channel side wall 233. The valve seat 231 is centrally positioned, the periphery of which forms the circumferential symmetrical, indented flow channel 232. The metallic annular portion 24b is provided with the sealing face 240, the opening portion 241, the minimum diameter area 242, the internal ring surface 243, the seal groove 245, the coolant gas ring groove 163, the external ring surface 246, the heat dissipation ribbed plate 248, a lower gas column 112, and a plurality of the lower bolt sleeves 132; as well as further provided with the coolant gas hole 162. The minimum diameter area 242 provided at one end of the annular portion 24 is connected to the second molded square portion 25b, and is positioned on the outer side of the flow channel 232. The heat dissipation ribbed plate 248 is fitted on the external ring surface 246 of the minimum diameter area 242 and connected to the second molded square portion 25b. The minimum diameter area 242 and the seal groove 245 are both the heat transfer restriction areas 147. The second molded square portion 25b is provided with the square plate 251, a plurality of the longitudinal vertical ribbed plates 254, and a plurality of the transverse vertical ribbed plates 255. An opening in the middle of the square plate 252 is used to contain the valve box 23, and connects to the flow channel side wall 233. The longitudinal vertical ribbed plates 254 are installed on the lower side of the square plate 251, and are used to connect to the upper sides of the inlet pipe 21 and the outlet pipe 22, and connect to the flow channel side wall 233. The square plate 251 and the longitudinal vertical ribbed plates 254 are all the heat transfer restriction areas 147. The valve box 23 of the valve body 2 and the metallic annular portion 24b construct the cup-shaped structure 26. The cup-shaped structure 26 is provided with the outer edge height 261 (H), the height of which is from the seal groove 245 to the sealing face 240. The outer edge height 261 (H) is at least 80% to 160% of the height of the upper valve body 5, Referring to FIG. 4C, which shows a protruding edge normally closed valve shaft set 72a applied in a metallic normally closed diaphragm valve 1c using the fixed normally closed valve shaft 4bc and the protruding edge upper valve body 5b. The gas chamber 175 is installed on the inner side of the non-metallic annular portion 24a and forms the annular gas chamber 176. The external threaded teeth valve shaft set 71a is assembled from the diaphragm 3, the protruding edge upper valve body 5b, and the fixed normally closed valve shaft 4bc.

Figure 4D:
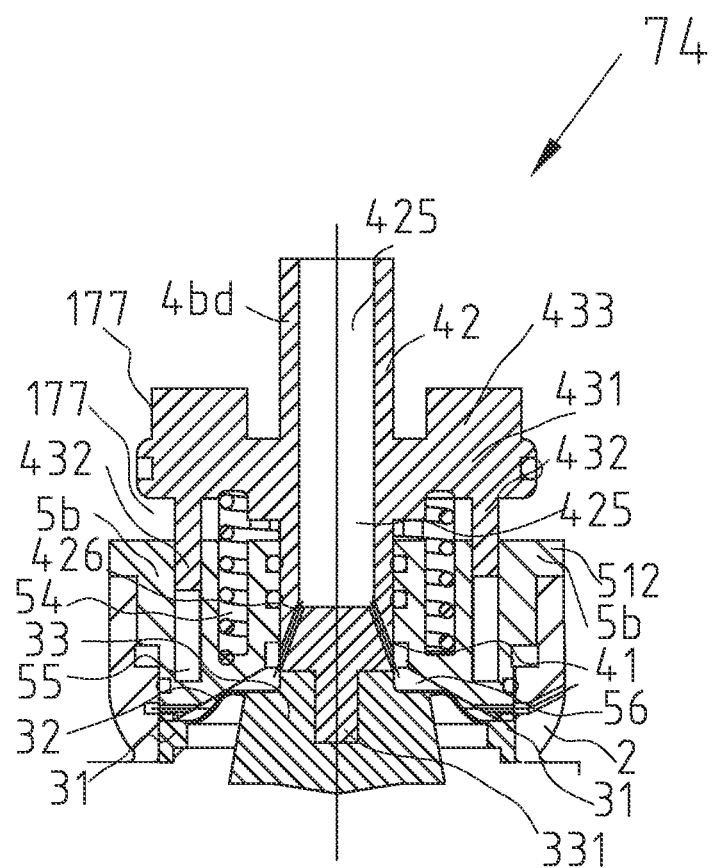
FIG. 4D is a cross-sectional view of a normally open protruding ring valve shaft set of the present invention.

Referring to FIG. 4D, which shows the protruding ring valve shaft set 72, applied in the metallic normally open diaphragm valve 1d using the normally open valve shaft 4bd and the protruding edge upper valve body 5b. The external threaded teeth valve shaft set 71 is assembled from the diaphragm 3, the protruding edge upper valve body 5b, and the normally open valve shaft 4bd.

Figure 4E:
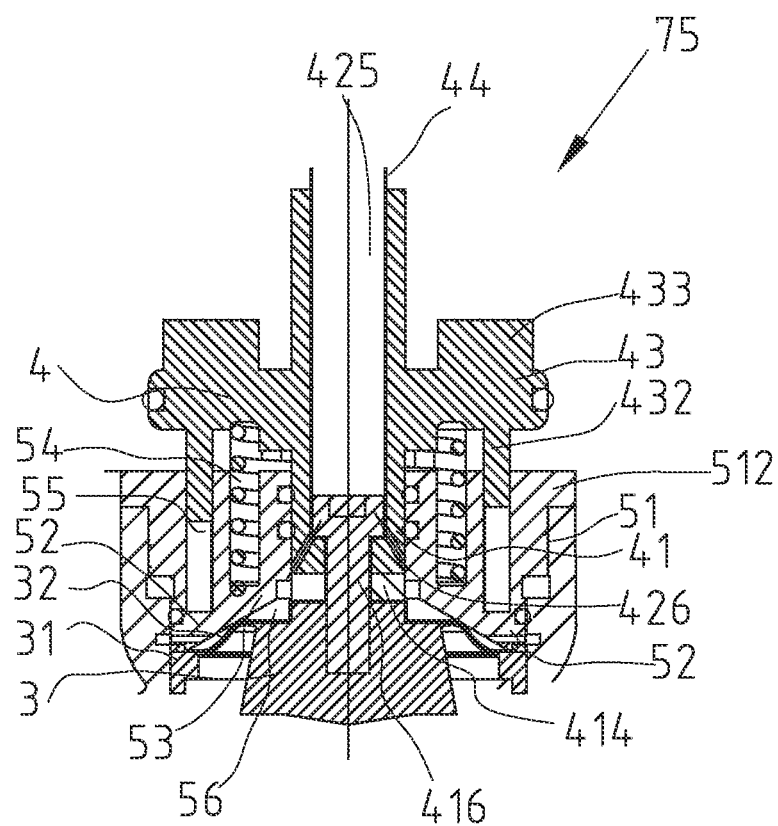
FIG. 4E is a cross-sectional view of a normally closed static electricity valve shaft set of the present invention.

Referring to FIG. 4E, which shows the electrostatic valve shaft set 73, wherein a conductive fibre 44 is inserted into the protruding ring valve shaft set 72. The conductive fibre 44 passes through the axis hole 425, and then through the radial clearance of the bolt hole 411 of the rotatable valve shaft 4a. The conductive fibre 44 is then fitted to the non-liquid contact side surface of the diaphragm 3 in an annular curved line fashion, and further connected to an external earth connection. The conductive fibre 44 is not affected by rotation of the valve shaft 4. The present invention can also use the normally open valve shaft 4bd, wherein the conductive fibre 44 passes through the axis hole 425, and then passes through the gas guide hole 426 of the fixed valve shaft 4b. The conductive fibre 44 is then fitted to the non-liquid contact side surface of the diaphragm 3 in an annular curved line fashion, and further connected to an external earth connection.

Figure 5C:
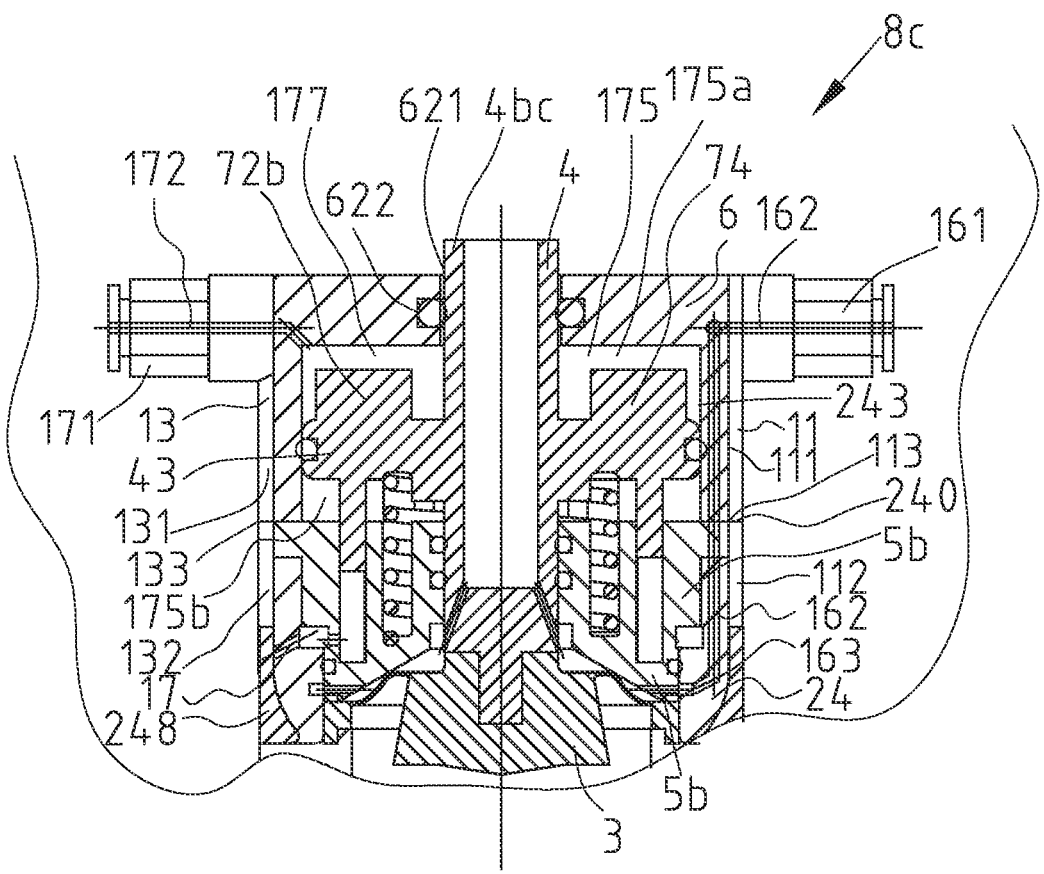
FIG. 5C is a partial cross-sectional view of a gas cylinder structure positioned on a valve upper cover gas chamber using a flange bearing set according to the present invention.
Figure 6A:
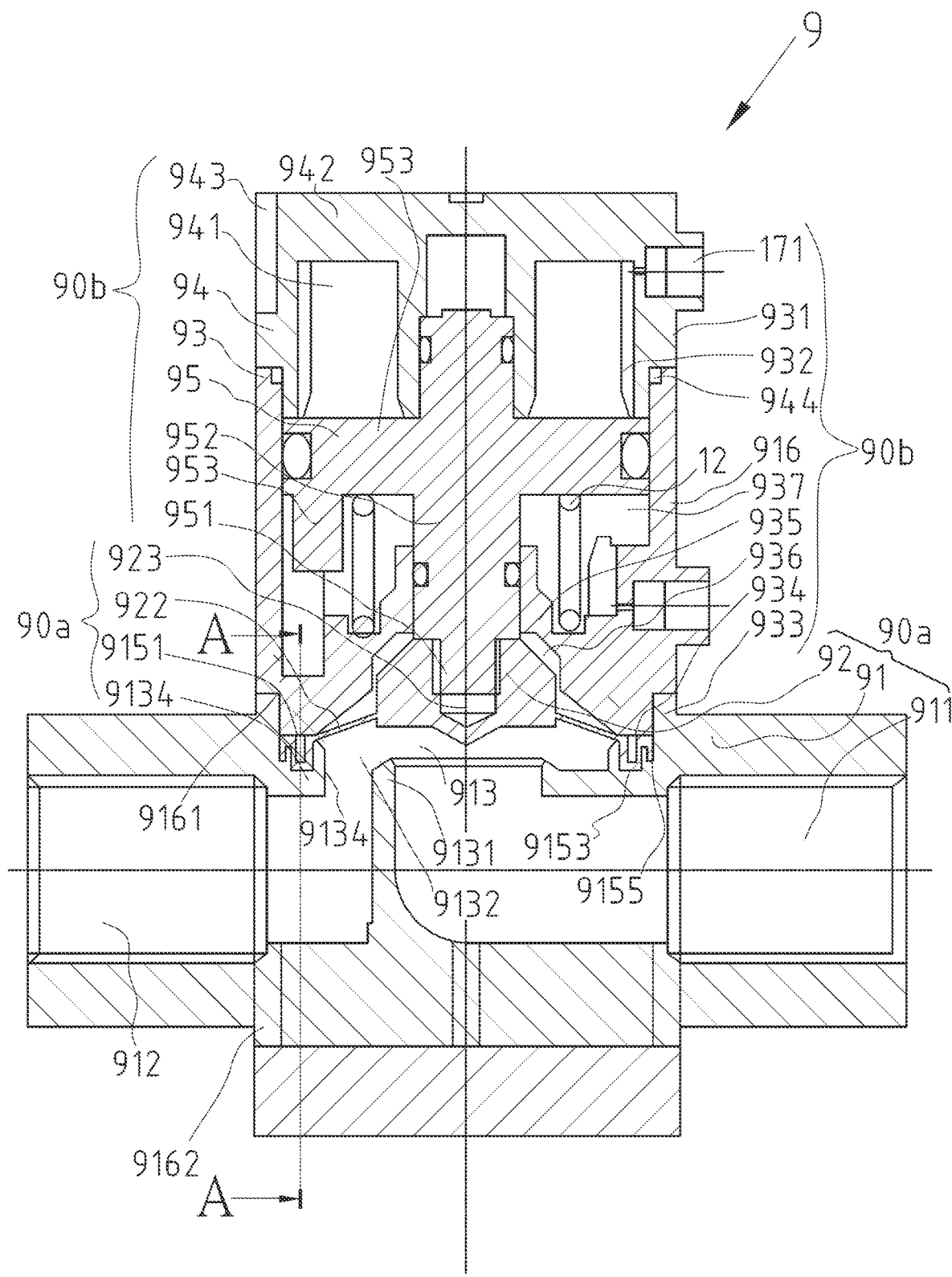
FIG. 6A is a cross-sectional view of a high temperature resistant diaphragm valve of the prior art.
Figure 6B:
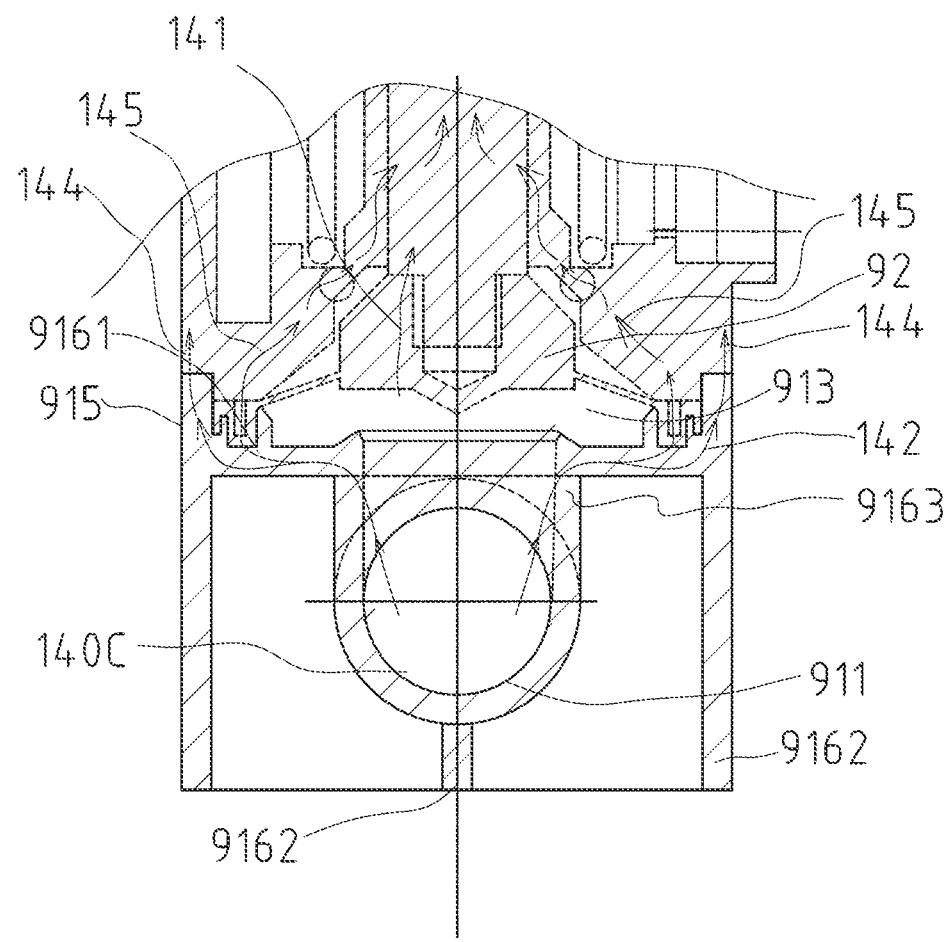
FIG. 6B is a horizontal cross-sectional view of a valve body of the prior art.
Figure 6C:
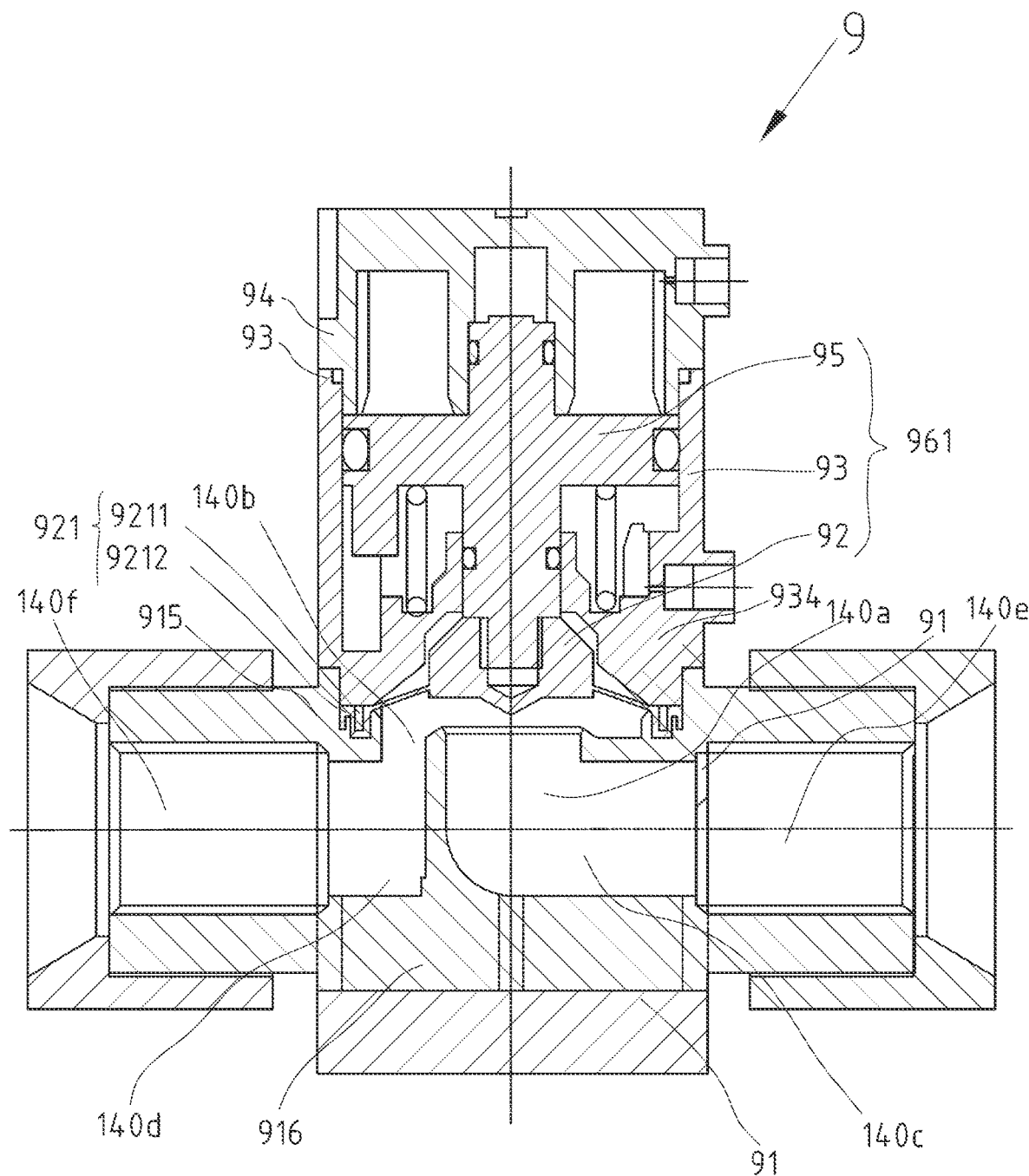
FIG. 6C is a schematic view of valve body heat source areas of the prior art.
Figure 6D:
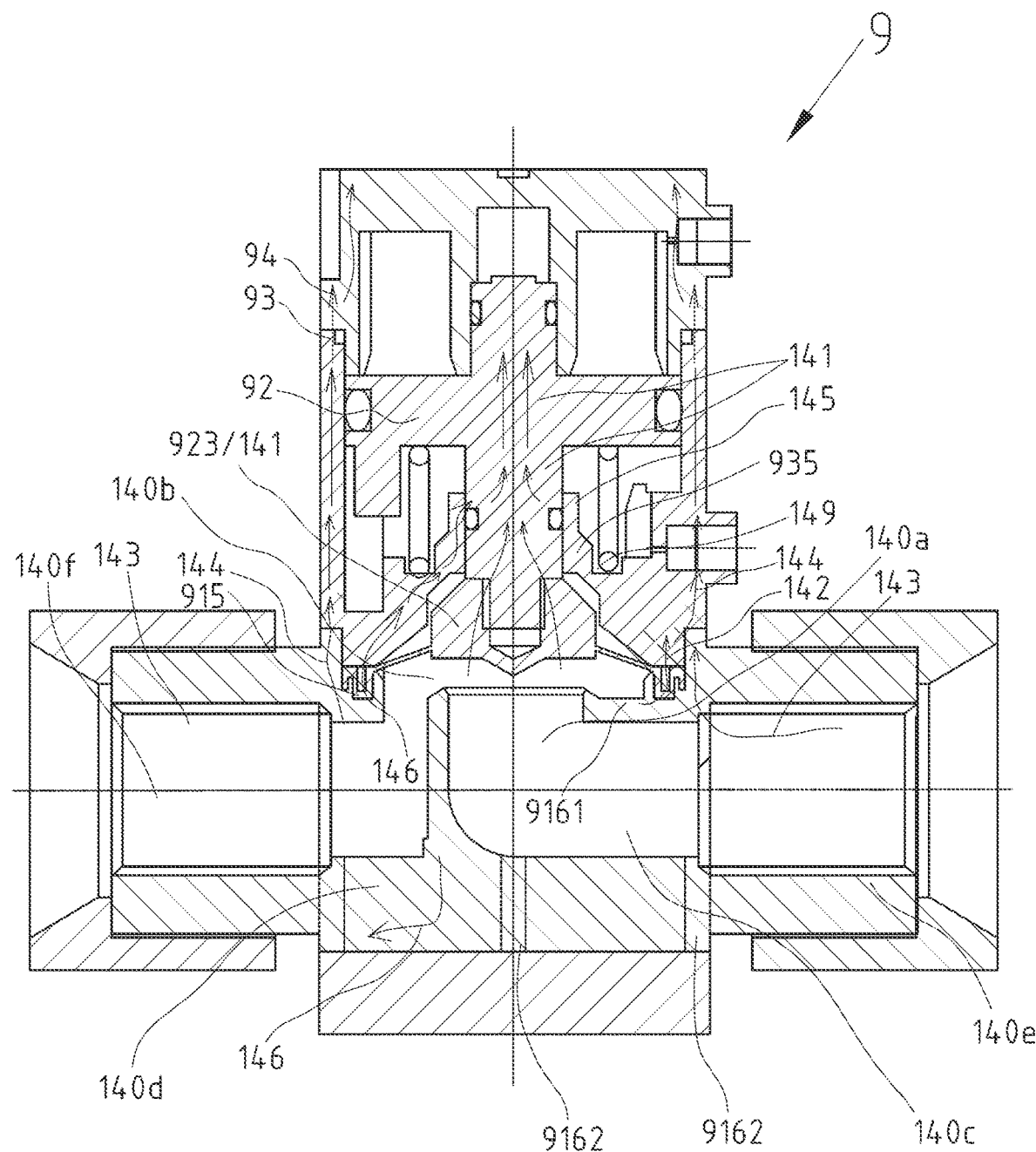
FIG. 6D is a schematic view of heat transfer paths of a diaphragm valve according to the prior art.
Figure 6E:
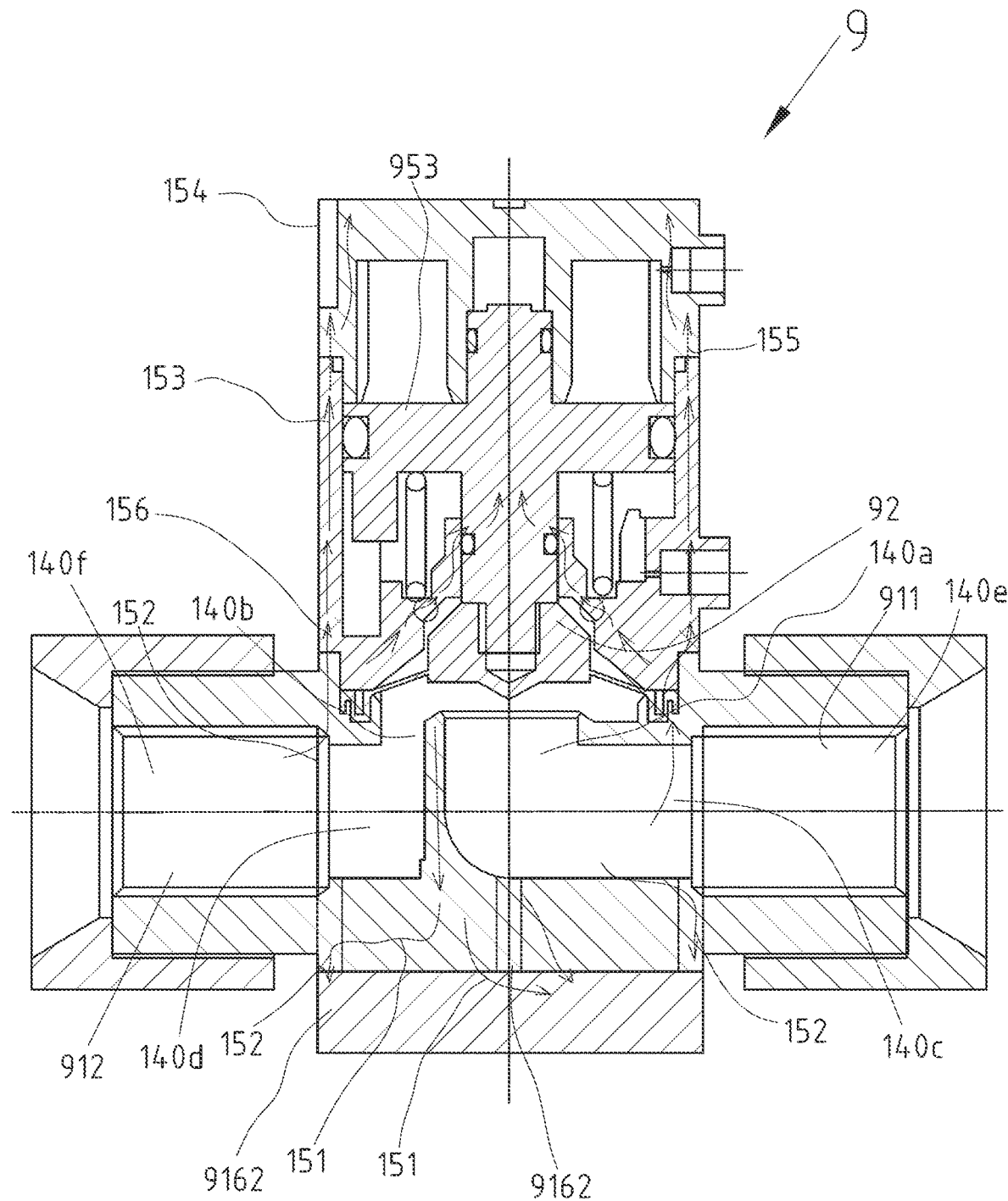
FIG. 6E is a schematic view of heat dissipation of a diaphragm valve according to the prior art.
Figure 6F:
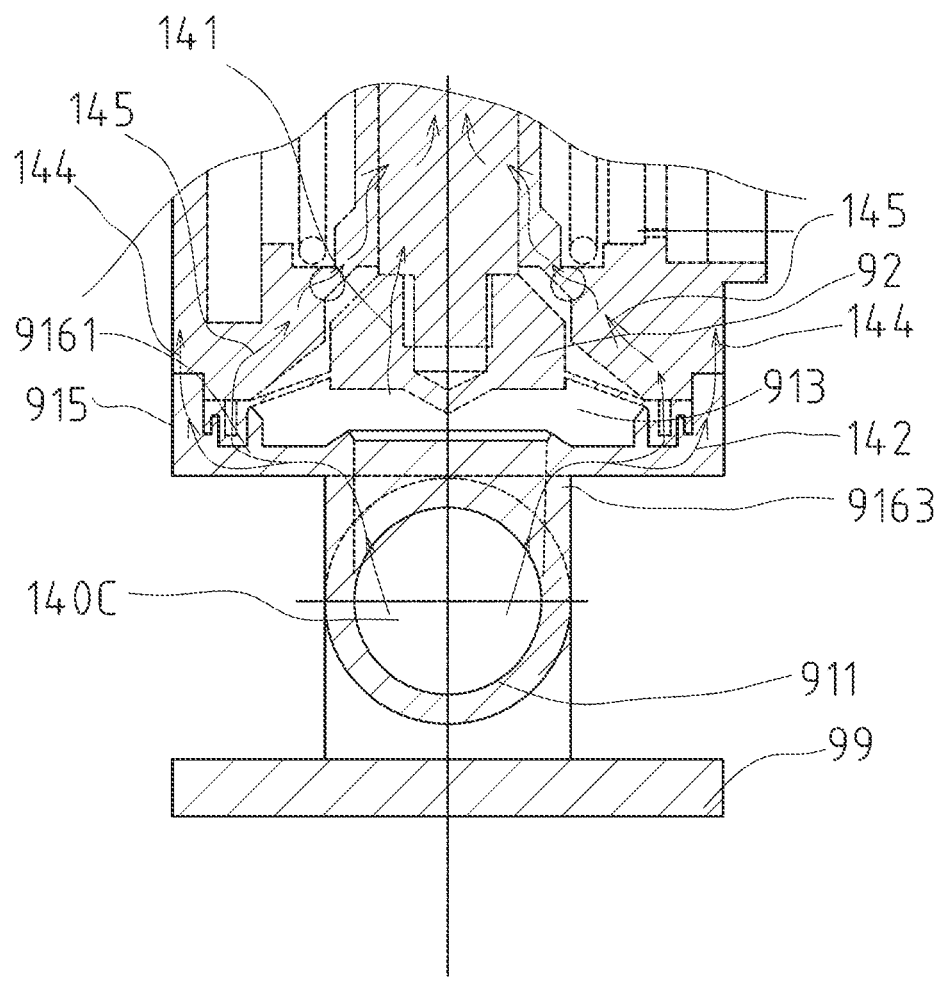
FIG. 6F is a cross-sectional view of a valve body of a diaphragm valve of the prior art that adopts a second molded square portion and a metallic annular portion.

Referring to FIG. 5C, which shows the gas cylinder structure of the valve upper cover gas chamber, and uses the protruding ring valve shaft set 72 for application in the metallic normally open diaphragm valve 1d using the normally closed valve shaft 4bc and the protruding edge upper valve body 5b. The gas chamber 175 is installed on the inner side of the metallic valve upper cover 6b and forms the valve upper cover gas chamber 177. The protruding ring valve shaft set 72 is assembled from the diaphragm 3, the protruding edge upper valve body 5b, and the normally closed valve shaft 4bc.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A thermal isolation method for diaphragm valve, which uses a diaphragm valve made from fluororesin material, the heat isolation method includes a heat transfer restriction method and a heat dissipation method, the heat transfer restriction method restricts heat transfer through wall thicknesses of a plurality of heat transfer restriction areas of a diaphragm valve structure, the wall thicknesses do not exceed or equal the thickness of an inlet pipe of the diaphragm valve structure, to the extent of being less than 3 mm, which are used to reduce the amount of heat being conducted through a plurality of heat source areas, to achieve heat separation effectiveness of a gas cylinder structure and the plurality of heat source areas, the heat dissipation method is carried out through a natural cooling structure and an internal cooling structure; wherein the natural cooling structure uses a plurality of ribbed plates of a square portion and a plurality of ribbed plates of an annular portion of the diaphragm valve structure, and a plurality of ribbed plates of a valve upper cover to carry out natural-convection cooling; the internal cooling structure then causes the inflow of an external coolant gas through a gas coolant flow channel of the annular portion, which then passes through a non-liquid contact side of a diaphragm and a hollow shaft rod.

2. The thermal isolation method for diaphragm valve according to claim 1, wherein the diaphragm valve includes a valve portion and an actuation gas cylinder, the valve portion includes a fluororesin valve body and the fluororesin diaphragm, the actuation gas cylinder includes an upper valve body, the valve upper cover, and a valve shaft; wherein the valve body includes the annular portion and the square portion, the ribbed plates of the square portion are lattice-shaped ribbed plates with horizontal openings positioned on the external surface of the square portion, the gas coolant flow channel includes one or more than one coolant gas hole in the annular portion, and the coolant gas holes afford passage to a coolant gas ring groove, the coolant gas ring groove further affords passage to a plurality of coolant gas guide holes in the upper valve body; the coolant gas guide holes afford passage to a non-liquid contact side of the diaphragm, and then passes through a plurality of gas guide holes in the valve shaft, which connect with a hollow shaft rod of the valve shaft and expelled to the outside therefrom.

* * * * *